United States Patent
Granger et al.

(10) Patent No.: US 9,552,741 B2
(45) Date of Patent: Jan. 24, 2017

(54) SYSTEMS AND METHODS FOR QUANTIFYING A SOUND INTO DYNAMIC PITCH-BASED GRAPHS

(71) Applicant: QUANTZ COMPANY LLC, Ashland, OR (US)

(72) Inventors: Shelly Sue Granger, Ashland, OR (US); Douglas Scott Gallatin, Kirkland, WA (US)

(73) Assignee: QUANTZ COMPANY, LLC, Ashland, OR (US)

( * ) Notice: Subject to any disclaimer, the term of this patent is extended or adjusted under 35 U.S.C. 154(b) by 0 days.

(21) Appl. No.: 14/813,008

(22) Filed: Jul. 29, 2015

(65) Prior Publication Data

US 2016/0042657 A1 Feb. 11, 2016

Related U.S. Application Data

(60) Provisional application No. 62/035,399, filed on Aug. 9, 2014.

(51) Int. Cl.
*G10H 1/00* (2006.01)
*G09B 15/02* (2006.01)

(52) U.S. Cl.
CPC .......... *G09B 15/023* (2013.01); *G10H 1/0008* (2013.01); *G10H 2210/066* (2013.01); *G10H 2210/091* (2013.01)

(58) Field of Classification Search
CPC ..... H04N 1/32203; G06F 19/26; G10L 25/90; G10L 19/00; G10L 21/06; G10L 15/02; G10L 19/02; G10L 21/003; G10L 2025/906; G10L 21/0232; G10L 25/00; G10H 2210/066; G10H 2250/235; G10H 2250/595; G10H 3/125; G10H 2210/201
See application file for complete search history.

(56) References Cited

U.S. PATENT DOCUMENTS 5,719,343 A 2/1998 Reyburn
7,589,727 B2 9/2009 Haeker
(Continued)

OTHER PUBLICATIONS

Pham et al. "A practical approach to real-time application of speaker recognition using wavelets and linear algebra." Proc. of 6th International Symposium on DSP for Communication Systems, 2002 (2002).

(Continued)

*Primary Examiner* — Marlon Fletcher
(74) *Attorney, Agent, or Firm* — Jerry Haynes Law

(57) ABSTRACT

A system and method that quantifies a sound into dynamic pitch-based graphs that correlate to the pitch frequencies of the sound. The system records a sound, such as musical notes. A pitch detection algorithm identifies and quantifies the pitch frequencies of the notes. The algorithm analyzes the pitch frequencies, and graphically displays the pitch frequency and notes in real time as fluctuating circles, rectangular bars, and lines that represent variances in pitch. The algorithm comprises a modified Type 2 Normalized Square Difference Function that transforms the musical notes into the pitch frequencies. The Type 2 Normalized Square Difference Function analyzes the peaks of the pitch frequency to arrive at a precise pitch frequency, such as 440 Hertz. A Lagrangian interpolation enables comparative analysis and teaching of the pitches and notes. The algorithm also performs transformations and heuristic comparisons to generate the real time graphical representation of the pitch frequency.

6 Claims, 19 Drawing Sheets

(56) References Cited

U.S. PATENT DOCUMENTS

| | | | |
|---|---|---|---|
| 7,935,880 B2 | 5/2011 | Stoddard | |
| 8,471,135 B2 | 6/2013 | Taub | |
| 2003/0066414 A1* | 4/2003 | Jameson | G10H 3/125 |
| | | | 84/741 |
| 2004/0260552 A1* | 12/2004 | Navratil | G10L 15/07 |
| | | | 704/269 |
| 2006/0095254 A1* | 5/2006 | Walker, II | G10H 1/0008 |
| | | | 704/207 |
| 2008/0307945 A1 | 12/2008 | Gatzsche et al. | |
| 2009/0119097 A1* | 5/2009 | Master | G10H 1/0008 |
| | | | 704/207 |
| 2009/0282966 A1* | 11/2009 | Walker, II | G10H 1/0008 |
| | | | 84/616 |
| 2011/0096073 A1 | 4/2011 | Adhikari | |
| 2011/0187718 A1 | 8/2011 | Diara | |
| 2012/0004749 A1* | 1/2012 | Abeyratne | A61B 7/003 |
| | | | 700/94 |
| 2012/0046771 A1* | 2/2012 | Abe | G10H 1/16 |
| | | | 700/94 |
| 2012/0106758 A1* | 5/2012 | Bonada | G10L 21/0272 |
| | | | 381/94.3 |
| 2013/0171591 A1 | 7/2013 | Franzblau | |

OTHER PUBLICATIONS

McLeod, "Fast, Accurate Pitch Detection Tools for Music Analysis", Doctoral Thesis, Apr. 22, 1980, University of Otago, Dunedin, New Zealand.

\* cited by examiner

SYSTEMS AND METHODS FOR QUANTIFYING A SOUND INTO DYNAMIC PITCH-BASED GRAPHS

CROSS REFERENCE OF RELATED APPLICATIONS

This application claims the benefits of U.S. provisional application no. 62/035,399, filed Aug. 9, 2014 and entitled SYSTEM AND METHOD FOR QUANTIFYING PITCH AND SOUND, which provisional application is incorporated by reference herein in its entirety.

FIELD OF THE INVENTION

The present invention relates generally to a system and method for quantifying a sound into dynamic pitch-based graphs. More so, the present invention relates to a system and method that records a sound, such as musical notes, and then provides a pitch detection algorithm that quantifies the pitch of the sound by generating a graphical representation of variances and durations in the pitch through artistic, data-driven formats in real time.

BACKGROUND OF THE INVENTION

The invention will now be described, by way of example, with reference to the accompanying drawings, in which:

The present invention is a system and method for quantifying a sound into dynamic pitch-based graphs by recording a sound, such as musical notes, and then provides a pitch detection algorithm that quantifies the pitch of the sound by generating a graphical representation of variances and durations in the pitch through artistic, data-driven formats in real time.

Those skilled in the art will recognize that pitch, in the musical sense, is the degree of height or depth of a tone or of sound, depending upon the relative rapidity of the vibrations by which it is produced. Often, pitch is a perceptual property that allows the ordering of sounds on a frequency-related scale. Pitches are compared as "higher" and "lower" in the sense associated with musical melodies, which require sound whose frequency is clear and stable enough to distinguish from noise. Pitch is a major auditory attribute of musical tones, along with duration, loudness, and timbre. In music the pitch of a note means how high or low a note is. The pitch of a note can be measured in units of Hertz.

Typically, in music, a note is a unit of fixed pitch that has been given a name, or the graphic representation of that pitch in a notation system, and often specifies a duration of time. A scale is an ascending or descending series of notes or pitches. Scales are described in many types such as tonal, modal, diatonic, derived or synthetic, and by the number of tones included. In the chromatic scale there are twelve pitches, and in the English language, these pitches are traditionally assigned the following primary letter names: A, B, C, D, E, F, and G. Modifiers are given to the letter names to complete the remaining five pitches. The two main modifiers are sharps and flats, and which respectively raise or lower the pitch of a note by a semitone.

In many instances, the basic ability required of a student of music is to produce and sustain a musical tone of defined pitch. This task is easy on an instrument like a piano which mechanically quantizes pitch. A singer, however, must dynamically adjust their vocal muscles to control pitch based on their aural perceptions. Similarly, a violinist must adjust their bowing and fingering based on their aural perceptions.

Typically, in music instruction, a student's aural perceptions are typically developed through collaboration with a music teacher who points out, by verbal comment and audible example, the pitch and timing errors of the student. Teaching musical skills is complicated by the fact that sound, unlike paintings, cannot directly be seen and only exist when played. Audio tape recorders allow a student to review their performance, but do not provide any analysis. Furthermore, teaching proper pitch requires minute observations of variances in the pitch.

It is known that the Fourier transform is a mathematical transformation employed to transform signals between time (or spatial) domain and frequency domain. This can have many applications in physics and engineering. For example, an audio signal from an instrument can be converted into an oscillating pitch frequency. This helps partially to quantify the sound. This pitch frequency is, however, insufficient for analyzing whether the pitch is correct or off key. Furthermore, Fourier Transformations do not produce a good speed versus accuracy trade off. Also, Fourier transformation by itself cannot determine pitch frequency. Another algorithm layered on top of the Fourier transformation is needed for this function. If the windows were long enough, the Fourier transformation could, however, quantify the sound to a reasonable degree.

In view of the foregoing, it is clear that these traditional techniques are not perfect and leave room for more optimal approaches.

SUMMARY

Illustrative embodiments of the disclosure are generally directed to a system and method that quantifies a sound into dynamic pitch-based graphs that correlate to the pitch frequencies of the sound. The system records a sound, such as musical notes. A pitch detection algorithm identifies and quantifies the pitch frequencies of the notes. The algorithm analyzes the pitch frequencies, and graphically displays the pitch frequency and notes in real time as fluctuating circles, rectangular bars, and lines that represent variances in pitch.

The pitch detection algorithm comprises a modified Type 2 Normalized Square Difference Function (NSDF) that transforms the musical notes into the pitch frequencies. The NSDF analyzes the peaks of the pitch frequency to arrive at a precise pitch frequency, such as 440 Hertz. A Lagrangian interpolation enables comparative analysis and teaching of the pitches and notes. The algorithm also performs transformations and heuristic comparisons to generate the real time graphical representation of the pitch frequency for display through various graphical tools.

In one exemplary application, the system analyzes the pitch frequency from a sound, and displays the correlating pitch line and associated notes in real time through multiple graphical tools. The graphical tools provide an in depth look into that which previously could not be viewed in a meaningful way. Each graphical tool displays a different aspect of pitch or sound in an artistic, data-driven format. For example, variations in pitch, harmony, pitch tendencies, and vibrato are graphically depicted in real time through variously shaped and dimensioned graphical tools.

The graphical tools used by the system may include, without limitation, a pitch circle that displays minute pitch variations in real time. A colored circle that changes shape represents the detected pitch. The circle changes color depending on which pitch is being played. Depending upon on how flat or sharp the pitch is on any given note, the circle changes shape. Another graphical tool may include a color wheel that shows the relationship between color and harmony. For example, when a note is played, the corresponding circle grows as long as the pitch sounds. The circle shrinks to the default size when the pitch is not, however, sounding.

Yet another graphical tool may include a note bar scene that represents the notes as bars that scroll in real time from right to left. In one exemplary use, a short bar represents a short note, longer bar represents a longer note. The notes that are higher on the screen are higher in pitch. The notes that are lower on the screen are lower in pitch. The system provides yet another graphical tool in the pitch line, which is similar to the note bar scene, except the pitch is graphically depicted as a line, rather than a rectangular block.

Yet another graphical tool may include a pitch circle graph that enables a user to see pitch tendencies that may not be so apparent by listening. The pitch circle graph comprises a pitch line that encircles multiple notes. As the pitch changes, the circular pitch deforms. Yet another graphical tool is a vibrato graph that depicts the speed and amplitude (highest and lowest pitch) of a vibrato in real time through amorphous, changing colors. The graphical tools are adjustable through settings boxes to provide a desired view of the pitches and notes.

In one embodiment, the pitch detection algorithm comprises a modified Type 2 NSDF that transforms an audio signal from the musical notes into pitch frequencies. The pitch detection algorithm is configured to normalize a square difference time-domain pitch detection algorithm with an autocorrelation time domain pitch detection algorithm, such that the stability of the Type 2 NSDF is maintained. In some embodiments, the pitch detection algorithm also enhances the pitch-accuracy for short windows characteristic of the autocorrelation function.

In another embodiment, the pitch detection algorithm transforms the pitch and sound into a dynamic pitch-based representation of the sound, such as a pitch contour having various shapes, with each shape providing a unique identifier and teaching point. The algorithm is configured to analyze at least a portion of the audio signal fast enough to create useful feedback for teaching music students, or at a higher level, for enabling practicing musicians to refine their technique. The Type 2 NSDF is only part of the functionality that quantifies the sound. It is the combination of algorithms, including Fourier transformations that enable the precise pitch detection at 60 Hz, 440 Hz, or other desired frequency.

One objective of the present invention is to graphically depict the pitches from musical notes in real time for singers, string players and instrumentalists of all levels and ages.

Another objective is to provide a learning tool that shows variances in pitch frequency, pitch tendencies, harmony, and vibrato for played musical notes.

Yet another objective is to provide a modified Type 2 NSDF that transforms an audio signal from the musical notes into pitch frequencies.

Yet another objective is to calculate the sampling of frequency at 60 times per second.

Yet another objective is to enable adjustments of the parameters of the graphical tools, such as x-y axis, color, rate of growth/shrinkage, and labeling.

Yet another objective is to provide a system and method for quantifying a sound into dynamic pitch-based graphs that can be downloaded and used on a communication device through a software application.

Yet another objective is to provide a system and method for quantifying a sound into dynamic pitch-based graphs that allows an experienced musician to hone in on minute pitch variations and vibrato characteristics, while also enabling a beginner to learn the basics of playing in tune and producing the correct notes.

BRIEF DESCRIPTION OF THE DRAWINGS

The invention will now be described, by way of example, with reference to the accompanying drawings, in which:

FIG. 3A illustrates a symmetrical circle representing perfect pitch, FIG. 3B illustrates a flat ellipse representing a flat pitch, and FIG. 3C illustrates a tall ellipse representing a sharp pitch, in accordance with an embodiment of the present invention;

FIG. 4A illustrates an exemplary settings screen for the colored circle format, FIG. 4B illustrates a smaller colored circle representing a flat pitch, FIG. 4C illustrates a larger colored circle representing a sharp pitch, FIG. 4D illustrates exemplary inner and outer reference circles turned off and FIG. 4E illustrates exemplary inner and outer pitch circle references adjusted, in accordance with an embodiment of the present invention;

FIG. 5A illustrates an exemplary settings screen for the color wheel format, FIG. 5B illustrates the pitch classes represented by different colors on the color wheel, and FIG. 5C illustrates an exemplary color wheel growing to correlate with a played note, in accordance with an embodiment of the present invention;

FIG. 6A illustrates an exemplary note bar settings box for the pitch scroll format, FIG. 6B illustrates exemplary notes scrolling from right to left in real time as rectangular bars, FIG. 6C illustrates exemplary notes scrolling from right to left as lines in a wide view format, FIG. 6D illustrates exemplary notes scrolling from right to left in a glissando format, and FIG. 6E illustrates an exemplary pitch scroll settings screen, in accordance with an embodiment of the present invention;

FIG. 7A illustrates a screenshot of a pitch line settings box 600, and FIG. 7B illustrates notes scrolling from right to left as exemplary pitch lines, in accordance with an embodiment of the present invention;

FIG. 8A illustrates the pitch circle graph, FIG. 8B illustrates the pitch circle graph with at least one peak, FIG. 8C illustrates an exemplary pitch tendency settings box, FIG. 8D illustrates the pitch circle graph displaying a first octave, FIG. 8E illustrates the pitch circle graph displaying a second octave, and FIG. 8F illustrates the pitch circle graph with no label for the notes, in accordance with an embodiment of the present invention;

FIG. 9A illustrates an exemplary vibrato graph settings box, FIG. 9B illustrates a first vibrato embodiment, FIG. 9C illustrates a second vibrato embodiment, FIG. 9D illustrates a third vibrato embodiment, and FIG. 9E illustrates a fourth vibrato embodiment, in accordance with an embodiment of the present invention;

FIG. 11A illustrates an exemplary input audio signal from the musical notes, FIG. 11B illustrates an exemplary power distribution of a Fourier transform of the audio signal, and FIG. 11C illustrates an exemplary Type 2 NSDF of the audio signal, in accordance with an embodiment of the present invention.

Like reference numerals refer to like parts throughout the various views of the drawings.

DETAILED DESCRIPTION OF THE INVENTION

Figure 1A:
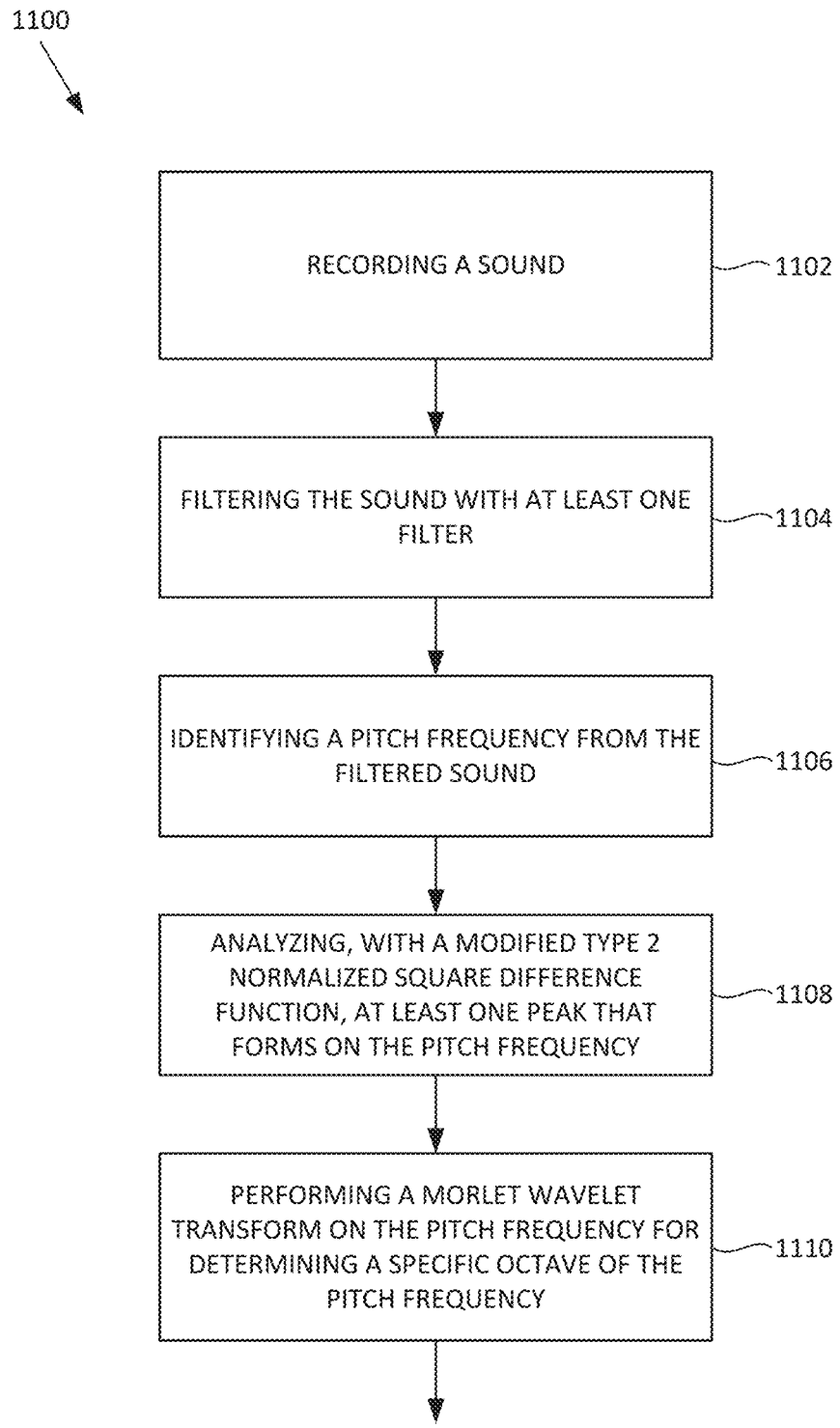
FIGS. 1A and 1B illustrate flowchart diagrams of an exemplary method for quantifying a sound into dynamic pitch-based graphs, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A system 100 and method 1100 for quantifying a sound into dynamic pitch-based graphs that correlate to the pitch of the sound is referenced in FIGS. 1A-12. The system 100 and method 1100 is configured to record a sound, such as musical notes 104, and then utilize a pitch detection algorithm to identify and quantify the pitch frequencies from the sound. The algorithm performs various transformations and heuristic comparisons to generate a graphical representation of variances and durations in the pitch. These graphical tools may be used by singers, string players, and instrumentalists of all levels and ages to hone in on subtle pitch variances and learn to listen for pitch tendencies, harmony, and vibrato.

In some embodiments, the pitch detection algorithm comprises a modified Type 2 NSDF 1004 that transforms the musical notes 104 into the pitch frequencies. The Type 2 NSDF 1004 analyzes the peaks of the pitch frequencies to arrive at a precise pitch frequency, such as 440 Hertz. A Lagrangian interpolation enables comparative analysis and teaching of the pitches and notes 104. The algorithm also performs transformations and heuristic comparisons to generate the real time graphical representation of the pitch frequency for display through various types of graphical tools.

In some embodiments, the system 100 and method 1100 for quantifying a sound into dynamic pitch-based graphs that can be downloaded and used on a communication device through a software application. The software application is sufficiently easy to use, such that singers, string players, and instrumentalists of all levels and ages can hone on subtle pitch variances and learn to listen for pitch tendencies, harmony, and vibrato. The software application enables the user to record the sound, analyze the sound with a pitch detection algorithm, and display the correlating pitch and notes 104 through the graphical tools. The settings for various graphical tools may also be adjusted through the software application. The software application may be operable on a communication device, including, without limitation, a smartphone, a smart watch, a tablet, a laptop, a server, and a computer.

In one exemplary application, the system 100 analyzes the pitch frequency from a sound, and displays the correlating pitch line and associated notes 104 in real time through multiple graphical tools. The graphical tools provide an in depth look into that which previously could not be viewed in a meaningful way. Each graphical tool displays a different aspect of pitch or sound in an artistic, data-driven format. For example, variations in pitch, harmony, pitch tendencies, and vibrato are graphically depicted in real time through variously shaped and dimensioned graphical tools.

The graphical tools used by the system 100 may include, without limitation, a pitch circle 200 that fluctuates within at least one reference pitch 206 to display minute pitch variations in real time. Another graphical tool is a colored wheel that changes shape represents the detected pitch. A colored wheel 410 changes color depending on which pitch is being played. Depending upon on how flat or sharp the pitch is on any given note 104, a pitch variance wheel 412 changes shape. Another graphical tool may include a colored wheel 410 for controlling the relationship between color and harmony of the pitch frequencies. For example, when a note 104 is played, the corresponding circle grows as long as the pitch sounds. The circle shrinks to the default size when the pitch is not, however, sounding.

Yet another graphical tool may include a note bar scroll format 518 that represents the notes 104 as bars that scroll in real time from right to left. In one exemplary use, a short bar represents a short note 104, longer bar represents a longer note 104. The notes 104 that are higher on the screen are higher in pitch. The notes 104 that are lower on the screen are lower in pitch. The system 100 provides a pitch line format 620 graphical tool, which is similar to the note bar scroll format 518, except the pitch frequency is graphically depicted as a pitch line 614, rather than a rectangular block 512. It is significant to note that the graphically depicted pitch line 614 can be recorded, paused, and then played back again. The capacity of the system 100 to save and replay graphical formats is applicable for any of the described pitches and their respective graphics.

Yet another graphical tool may include a pitch tendency circle 700 that enables a user to see pitch tendencies that may not be so apparent by listening. The pitch tendency circle 700 comprises a pitch line that encircles multiple notes 104. As the pitch frequency changes, the spherical pitch tendency circle 700 deforms to 704 form at least one peak. Yet another graphical tool is a vibrato graph 802 that depicts the speed and amplitude (highest and lowest pitch) of a vibrato in real time through amorphous, changing colors. The graphical tools are adjustable through settings boxes to provide a desired view of the pitch frequencies and notes 104.

In some embodiments, a system 100 and method 1100 quantifies a sound into a dynamic pitch-based image. Specifically, the system 100 and method 1100 quantifies musical notes 104 into sound data by analyzing the pitches of the musical notes 104. The different pitches are transformed into a graphical representation through a pitch detection algorithm. The graphical representation formed by the pitch detection algorithm visually depicts variances and durations in the pitch in real time. This can be efficacious for helping to enhance musical lessons and create visual musical performances.

For example, the graphical representations can help beginners to learn to hear musical intervals and professionals to understand some of the subtle choices needed to make in expressive intonation. Those skilled in the art, in light of the present teachings, will recognize that pitch is the perception of how high or low a musical note sounds. For the present invention, the pitch may be considered as a frequency that corresponds closely to the fundamental frequency or main repetition rate in the musical note. Furthermore, it is significant to note that a note's 104 fundamental frequency may be different than a note's 104 pitch frequency.

In one embodiment, the pitch detection algorithm comprises a modified Type 2 NSDF 1004 that transforms an audio signal 1000 from the musical notes into data representing the pitch frequencies. The pitch detection algorithm may also utilize an autocorrelation time domain pitch detection algorithm, such that the stability of the NSDF 1004 is maintained. In some embodiments, the pitch detection algorithm also enhances the pitch-accuracy for short windows characteristic of the autocorrelation function.

In another embodiment, the pitch detection algorithm transforms the sound into a dynamic pitch-based representation of the sound, such as a pitch contour having various shapes, with each shape providing a unique identifier and teaching point. The algorithm is configured to analyze at least a portion of the audio signal fast enough to create useful feedback for teaching music students, or at a higher level, for enabling practicing musicians to refine their technique. The NSDF 1004 is only part of the functionality that quantifies the sound. It is the combination of the NSDF 1004 with Fourier transformations, Lagrangian interpolation, and heuristic comparisons that enable the precise pitch detection, including those at 60 Hz and 440 Hz. Different equations for the NSDF 1004 may, however, be used to analyze the pitch and sound as various types of NSDF 1004 and the definitions of values in the NSDF 1004 change. It is, however, significant that it is the combination of algorithms that enable the precise pitch detection. In future possible embodiments, the system 100 may accomplish this on first generation tablets and phones.

Figure 1B:
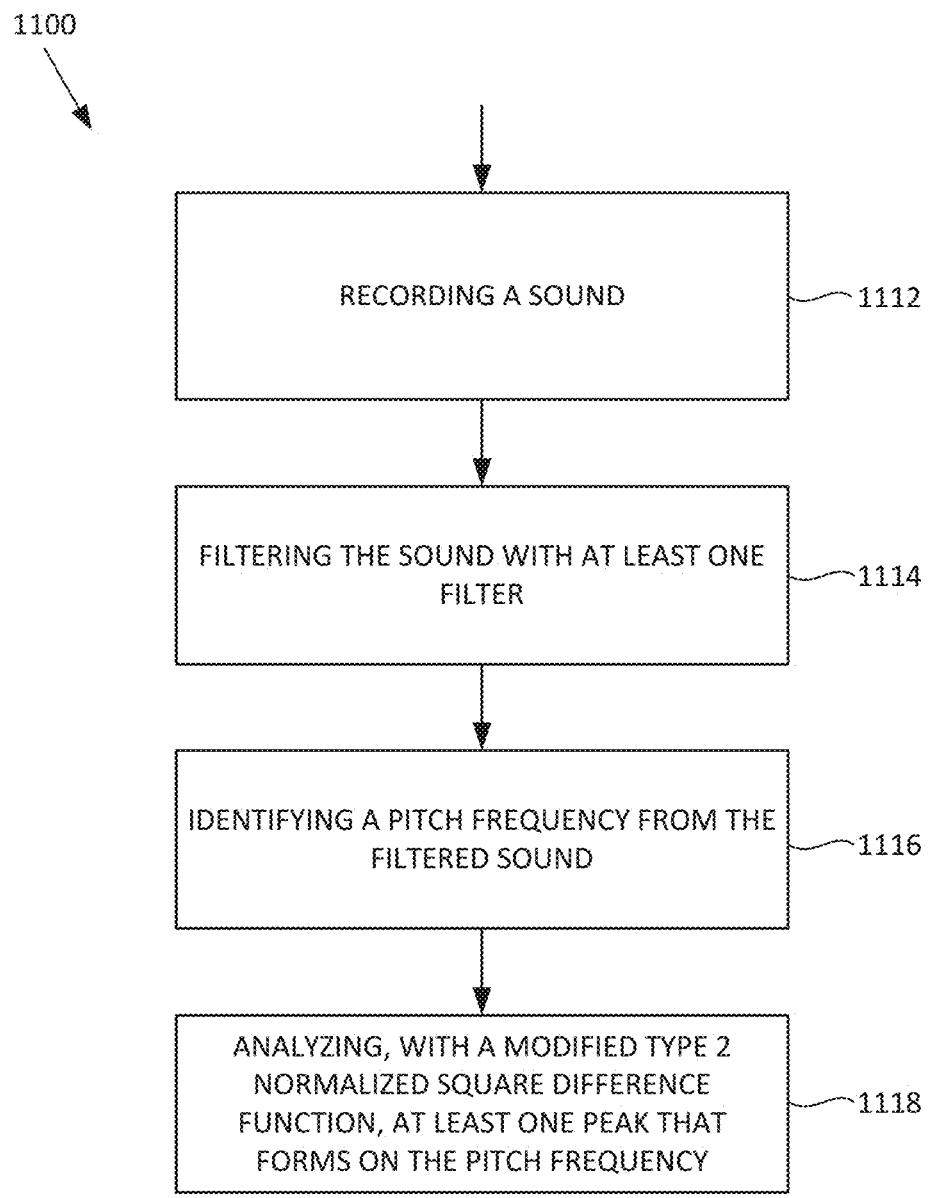

In one embodiment referenced in the flowchart diagrams of FIGS. 1A and 1B, a method 1100 for quantifying a sound into dynamic pitch-based graphs provides an initial Step 1102 of recording a sound. The sound may include musical notes 104 having pitch, frequency, tone, treble, and bass. A Step 1104 may include filtering the sound with at least one filter. A sound filter known in the art may be used. In some embodiments, a Step 1106 may include identifying a pitch frequency from the filtered sound. The pitch frequency may include a perceptual property of sounds that allows their ordering on a frequency-related scale. In one embodiment, the pitch frequency enables the comparison of sounds as higher and lower in the sense associated with musical melodies.

A Step 1108 includes analyzing, with a modified Type 2 NSDF, at least one peak that forms on the pitch frequency. The NSDF 1004 is an integral part of the pitch detection algorithm. The NSDF 1004 is configured to normalize a square difference time-domain pitch detection algorithm with an autocorrelation time domain pitch detection algorithm, such that the stability of the NSDF 1004 is maintained. A Step 1110 may include performing a Morlet Wavelet transform on the pitch frequency for determining a specific octave of the pitch frequency. The octave is part of the pitch frequency that shows the interval between one musical pitch and another with half or double its frequency.

The method 1100 may include a Step 1112 comprises verifying a specific octave of the pitch frequency based on a power spectrum. A Step 1114 comprises of increasing the speed of the pitch frequency and the at least one peak through a Lagrangian interpolation. The Lagrangian interpolation may include a polynomial interpolation that is the interpolation of a given data set by a polynomial: given some points, find a polynomial which goes exactly through these points.

A Step 1116 includes generating a graphical representation of the pitch frequency. The graphical representation of the notes 104 can be displayed in various graphical formats, including an artistic and colorful array of shapes that mimic the variances and durations of the pitch and sound. Examples are a pitch circle 200, a note bar scroll format 518, and a vibrato graph 800. A final Step 1118 comprises comparing the graphical representation of the pitch frequency to a reference pitch frequency.

In one alternative embodiment of the method 1100, at least one original musical score is integrated into the pitch detection algorithm to serve as a reference. The addition of the musical score enhances pitch detection by providing shorter windows and more accurate determination of the octave. Specifically, the successive approximation and autocorrelation method 1100 for calculating signals generated by the NSDF 1004 are combined. In essence, the successive approximation approach is used on a narrow set of possible values within a couple steps of the previous frame.

The pitch detection algorithm performs a custom comparison heuristic to the resulting signal against the previous frame's NSDF signal. This provides an estimation of the accuracy of the new approximation of the pitch. This comparison heuristic compares local maxima and minima of the two signals, while discounting octave differences between the signals from the immediate prior frame and the new frame. If this comparison heuristic fails, then the NSDF signal for the most recent frame is recalculated using the full autocorrelation approach.

The heuristic is tuned such that if the NSDF signals from the frames differ by more than approximately 13% of the linearized distance between notes 104 at the current octave are triggered. This autocorrelation approach to calculate NSDF cuts several corners to trade stability for speed. First, the input signal is passed through a third order low pass filter to remove the DC component of the signal. Then, only the first ¾ of the NSDF signal is calculated while being padded to only a quarter of the function input.

The last quarter of the signal is synthesized based upon the pattern of maxima and minima in the first two quarters. This decreases the window size at the cost of decreasing stability with lower frequencies in order to greatly reduce the size of the calculation required. In practice, this means that the lower frequencies are more likely to be interpreted as exactly one octave higher/lower and any pitch errors introduced by truncating the calculation are recovered over the next frames with the targeted successive approximation approach.

Once the NSDF function of the subsequent frame has been calculated, a McLeod's pitch detection heuristic is run to transform the NSDF function into a candidate frequency for the frame. A next step may include performing a coarse-grained first and second order FFT of the original input signal along with a simple first-order wavelet transform. The first order FFT and wavelet transforms are compared to the estimated frequency from the NSDF approach with a heuristic in order to determine octave by matching the frequency spectrum against the expected harmonic series for the note 104.

The second order FFT is used to feed into a vibrato parameter calculations (speed, depth, etc.) and is used to ensure that the frequency delta is not changing too rapidly with the selected octave from the previous step. Once the octave is determined, the NSDF function frequency is adjusted to match the proper octave and is fed out to the graphical tools to be shown to the user. This whole process has been optimized such that even on first generation tablets and second generation smartphones the pitch detection algorithm can be performed at approximately 64 fps in order for the second order FFT to be accurate about the vibrato calculations and for the visualizations to be able to show minute differences in vibrato/pitch.

The vibrato speed/depth calculations effectively are a paired down version of the pitch detection algorithm operating on an input signal built from the output of the pitch detection algorithm. Because the sampling frequency is much lower and the windows are so much smaller, many of the heuristics above are paired down and the FFT's/autocorrelations are so small that performance matters less. Thus the full NSDF autocorrelation approach performs on each frame to obtain the second-order data, while also not performing the third or fourth order FFT's at the end.

Figure 2:
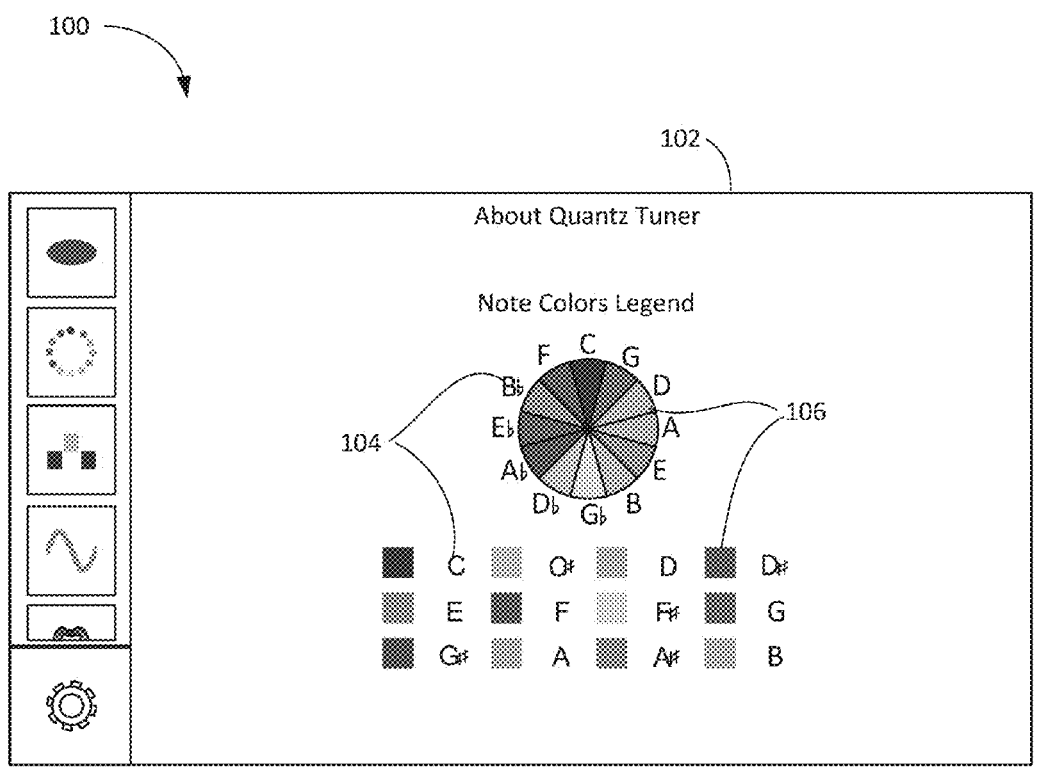
FIG. 2 illustrates a screenshot of an exemplary system for quantifying pitch and sound displaying various pitch classes delineated by color, in accordance with an embodiment of the present invention.

As referenced in FIG. 2, a system 100 enables real time visualization of the musical notes 104 as they are being played. The pitch frequency from the sound is quantified into a variety of graphical representations that demonstrate, in real time, subtle variances in the pitch, durations of the pitch, and changes between different pitch classes, or notes 104, i.e., A, B, C, D, E, F, G, either flat or sharp.

In one possible embodiment, an information screen 102 displays each pitch class as a circle having a unique color that correlates to the pitch class. A color legend 106 may identify the matching color and note 104 in relation to the pitch frequencies and notes 104. One exemplary color legend 106 includes a blue-green color to represent the A note 104, yellow-green represents the B note 104, etc. In other embodiments, additional musical tone characteristics, beyond pitch frequency, such as volume, intensity, duration, and timbre, may, however, be graphically depicted by the algorithm.

As depicted in FIGS. 3A-9E, the graphical representation of the notes 104 can be displayed in various graphical formats, including an artistic and colorful array of shapes that mimic the variances and durations of the pitch and sound. In one embodiment, the visualization of the pitch in the musical note 104 can help beginning music students to play a musical instrument in tune and play the correct note 104. Likewise, the more advanced student can visually hone in on minute pitch variations and vibrato characteristics of the notes 104. Additionally, the variously configured graphical formats of the pitch frequencies can be incorporated into a musical performance to create an artistic display of sound.

Figure 3A:
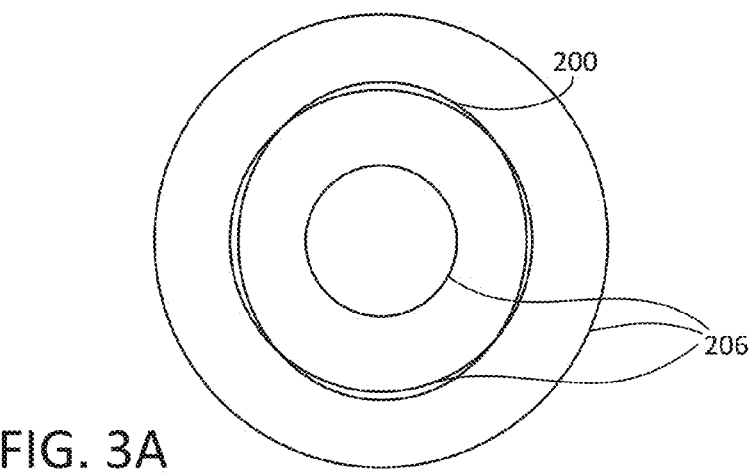
FIGS. 3A, 3B, and 3C illustrate exemplary graphical representations of a colored circle that fluctuates to depict minute pitch variations in real time, where
Figure 3B:
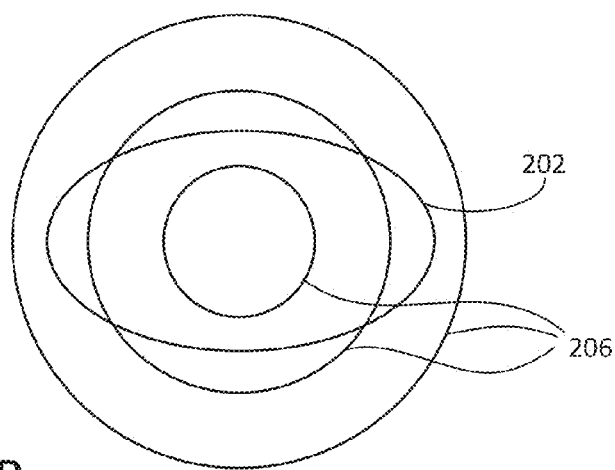
Figure 3C:
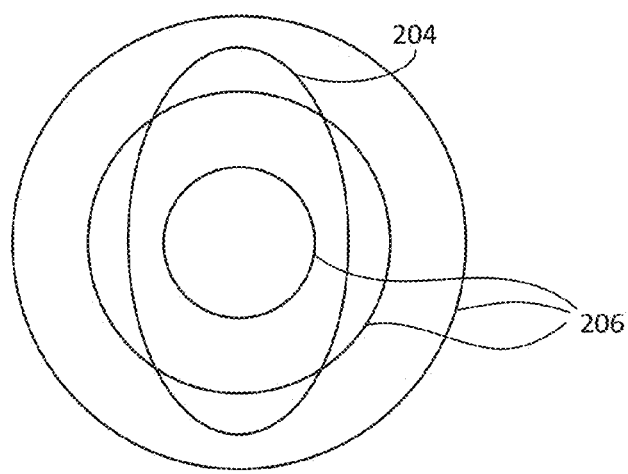

FIGS. 3A, 3B, and 3C illustrate graphical representations of the pitch frequencies in the form of a colored pitch circle 200 that fluctuates between a spherical and an elliptical shape in response to changes in the pitch frequency. The fluctuations of the pitch circle 200 within an inner and an outer reference circle create an environment of comparative analysis that helps identify minute pitch variations in real time. In essence, the pitch circle 200 represents a sensitive, real-time tuner. The color of the pitch circle 200 defines the pitch classes. For example, FIG. 2A illustrates a spherical default shape for the pitch circle 200 that represents a perfectly played pitch for a G note 104. FIG. 2B illustrates an alternative horizontal flat ellipse circle 202 representing a flat pitch for a G note 104. FIG. 2C illustrates another alternative vertical tall ellipse circle 204 representing a sharp pitch for a G note 104.

In some embodiments, the pitch circle 200 may position relative to a reference pitch 206 for comparative analysis. The reference pitch 206 may include concentric circles that forms outside and inside the pitch circle 200. The pitch circle fluctuates within the reference pitch 206 in accordance with the pitch being played. In this manner, a user may more quickly recognize whether the correct musical note 104 is being played correctly. Additionally, the color in the pitch circle 200 and the changes of differently pitch circles 200 to mark a different pitch classes being played in real time create an artistic effect on the screen.

Figure 4A:
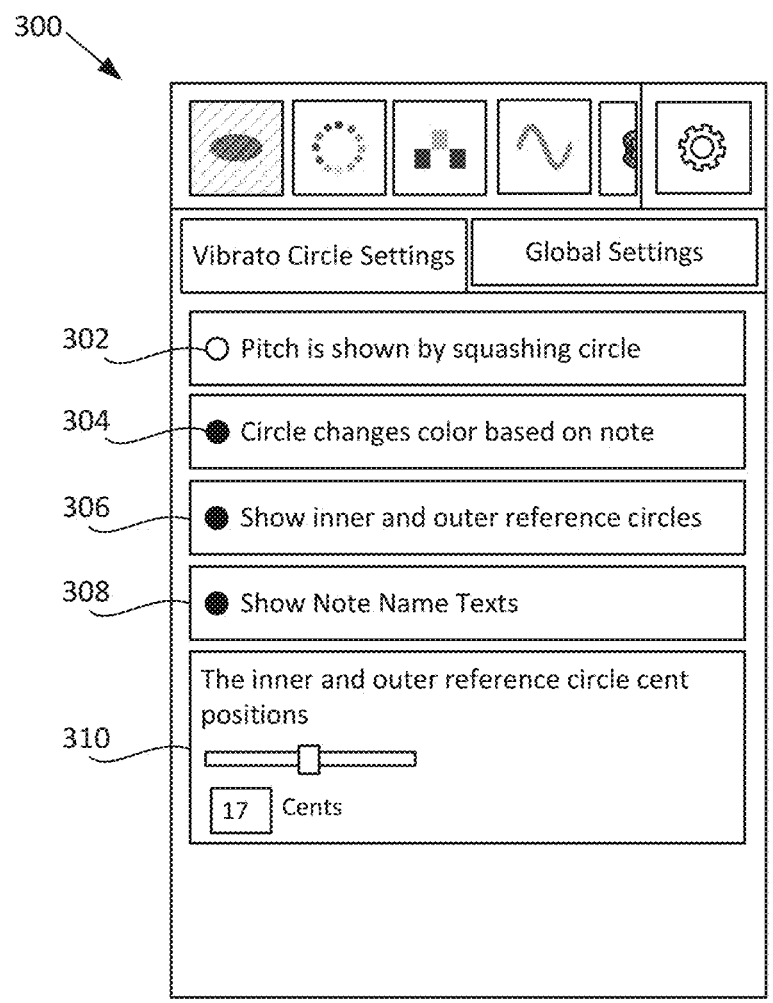
FIGS. 4A, 4B, 4C, 4D, and 4E illustrate screenshots and diagrams of exemplary settings for the graphical representations of the pitch where settings control the graphical representation of the colored circle format, where

FIG. 4A illustrates a screenshot of a pitch circle settings box 300 for controlling the parameters of the pitch circle 200 in a pitch circle format. The settings can be used to create various configurations for the fluctuating pitch circles 200, 202, 204. In one embodiment, the pitch circle settings box 300 may include, without limitation: a shape selection portion 302 that allow the pitch to be graphically depicted as a squashed circle (ellipse); a color selection portion 304 that enables the pitch circle 200 to change color based on the note 104 that is played; a reference circle portion 306 that allows for showing or hiding the inner and outer reference circles that represent the reference pitch 206; and a reference size adjustment portion 310 that enables adjustment of the inner and outer reference circles. The name of the note 104 may also be toggled on or off next to the pitch circle 200 with a circle note name portion 308.

Figure 4B:
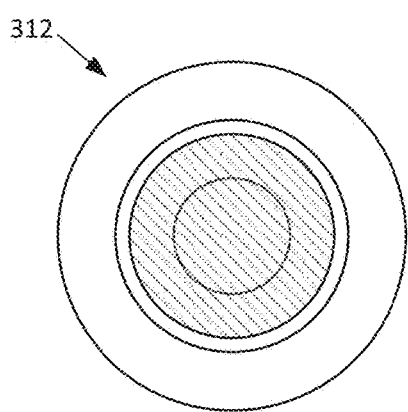
Figure 4C:
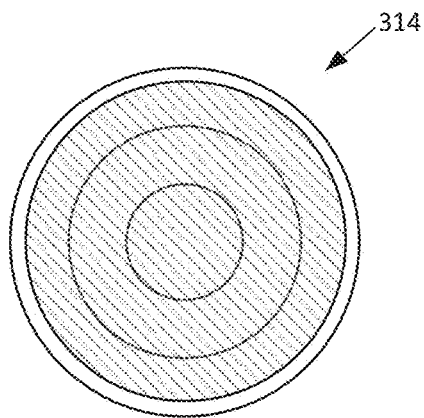
Figure 4D:
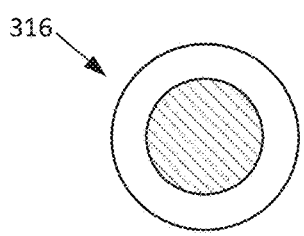
Figure 4E:
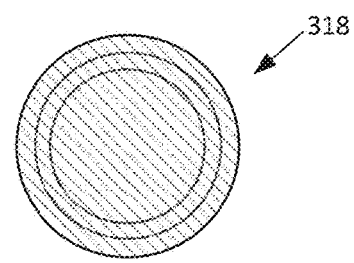

Turning now to FIGS. 4B and 4C, the pitch circle format can be depicted either as a fluctuating circle 312 that grows or shrinks with the pitch frequencies, or as a symmetrical or flattened circle 314, based on the shape selection portion. FIG. 4D illustrates the inner and outer reference circles turned off, and FIG. 4E illustrates the inner and outer pitch circle references adjusted to allow smaller pitch increments between the concentric circles, thus forming a multiple referenced circle 318 relative to the reference circle portion 306. In alternative embodiments, the pitch circle 200 may be replaced by other shapes, including, without limitation, a rectangle, a square, a triangle, and a parallelogram.

Figure 5A:
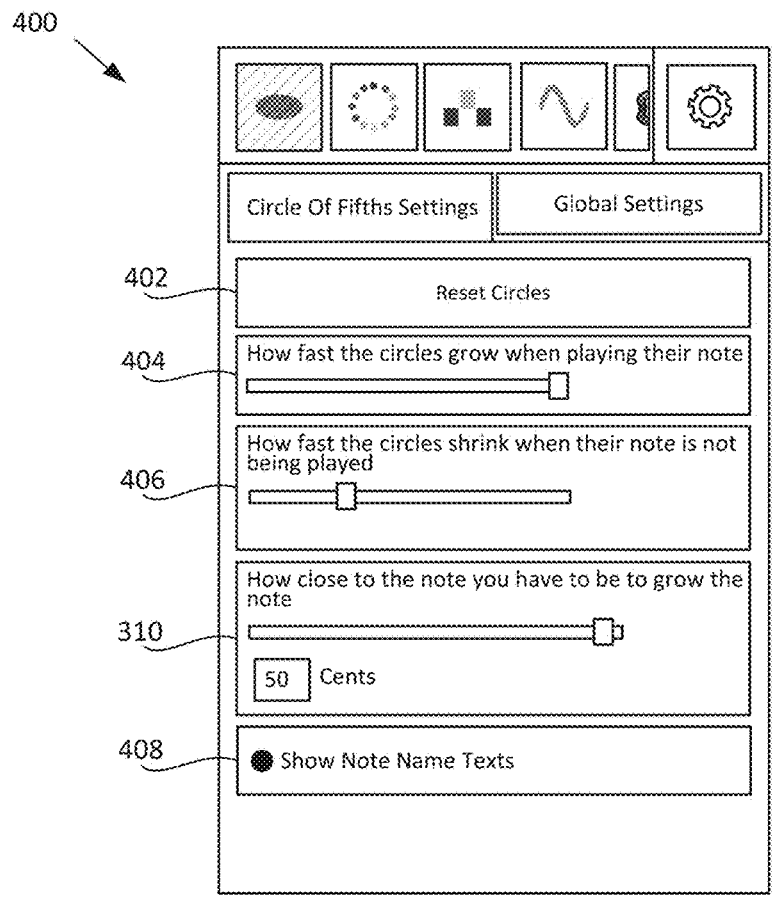
FIGS. 5A, 5B, and 5C illustrate screenshots and diagrams of exemplary settings for the graphical representations of the pitch where settings control the graphical representation of an exemplary color wheel format, where

FIG. 5A shows a screenshot of a colored wheel settings box 400 for controlling the relationship between color and harmony of the pitch frequencies. The colored wheel settings box 400 enables adjustment of the graphical appearance of the colored wheel format. The colored wheel format comprises a colored wheel 410 and a pitch variance wheel 412 arranged adjacently in a substantially circular shape. Each wheel 410, 412 is assigned a color that correlates to a pitch class, i.e., A#, B, C sharp, etc.

The colored wheel settings box 400 may include, without limitation: a growth rate portion 402 that controls how fast the colored wheel 410 and the pitch variance wheel 412 grow when the correlating note 104 is played; a shrink rate portion 404 that controls how fast the pitch circle 200 shrinks to the default size after the correlating note 104 has been played; and a sensitivity portion 406 that controls how close the note 104 has to be when played with a predetermined number of cents. The name of the pitch class may also be toggled on or off next to the correlating pitch circle 200 in the wheel through a wheel note name portion 408.

Figure 5B:
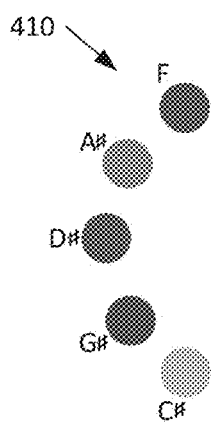
Figure 5C:
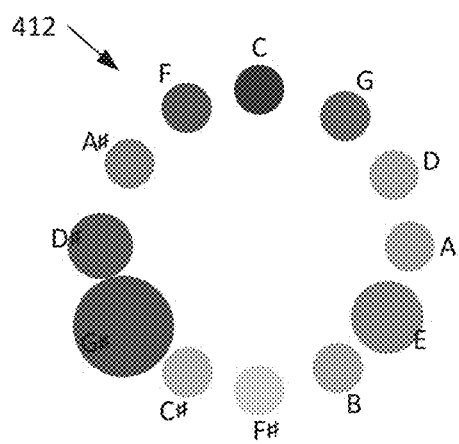

In one example illustrated in FIG. 5B, the colored wheel 410 comprises a pitch class F having a light purple center with a dark purple border. F# is a light yellow circle center with a dark yellow border. A is a blue-green circle center with a dark green border. When a note 104 is played the interior color of the colored wheel 410 slightly darkens and the corresponding circle in the wheel grows as long as the pitch sounds. The colored wheel 410 shrinks to the default size when the note 104 is not being played. FIG. 5C illustrates a pitch variance wheel 412 comprised of growing pitch circles 200 representing the pitch classes of G#, D#, and E. Each pitch class in the pitch variance wheel 412 grows at a rate that is in appropriate proportion to a correlating played note 104.

Those skilled in the art, in light of the present teachings, will recognize that the pitch/color relationships on the colored wheel 410 are functional and inherent. For example, if the notes 104 are kept in the same position and the colored wheel 410 is rotated, the relationship of opposites is still maintained. The colors that are positioned directly opposite each other on the colored wheel 410 form opposite colors in color theory. Similarly, the pitches directly across from each other on the colored wheel 410 are harmonic opposites in music theory. In summation, the adjacent pitches are harmonically similar, just as the adjacent colors are very similar on the colored wheel. In one possible embodiment, the colors in the colored wheel 410 may be rotated, such as in a dial, while leaving the notes 104 in a fixed position. For example, C pitch class could remain the color red, as long as the relative positions of the colors are maintained.

Figure 6A:
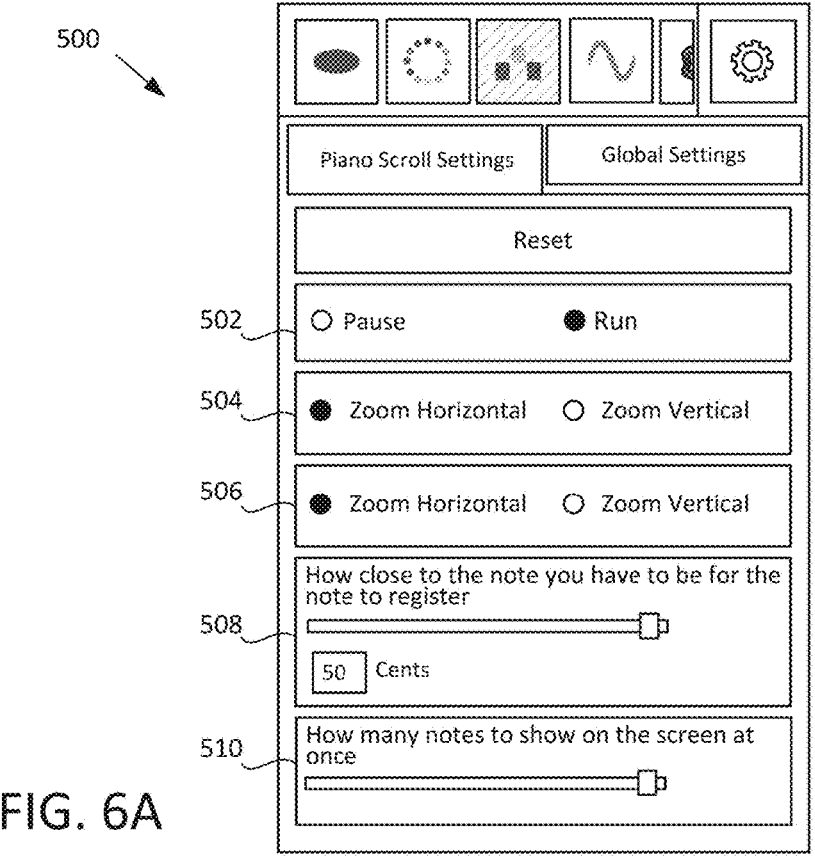
FIGS. 6A, 6B, 6C, 6D, and 6E illustrate screenshots and diagrams of exemplary settings for the graphical representations of the pitch for notes on an exemplary pitch scroll format, where

FIG. 6A illustrates a screenshot of a note bar settings box 500 for controlling the parameters of the pitch and sound of notes 104 for a note bar scroll format 518. In one embodiment, the notes 104 scroll from right to left in real time on a screen. In one embodiment of the note bar settings box 500 controlling the parameters of the pitch and sound of notes 104, a note bar pause button 514 enables stoppage of the scrolling, and a note bar hourglass button 516 enables expansion and contraction of the screen.

The notes 104 are depicted as at least one rectangular bar 512, with each rectangular bar 512 representing a different pitch. The length of the rectangular bar 512 represents the amount of time a note 104 is held. For example, a short bar represents a short note, longer bar represents a longer note. Notes that are higher on the screen are higher in pitch. Notes that are lower on the screen are lower in pitch. The rectangular bar 512 provides a more precise graphical depiction of variations in the pitch by showing minute variations in pitch, and clear viewing of vibrato.

Figure 6B:
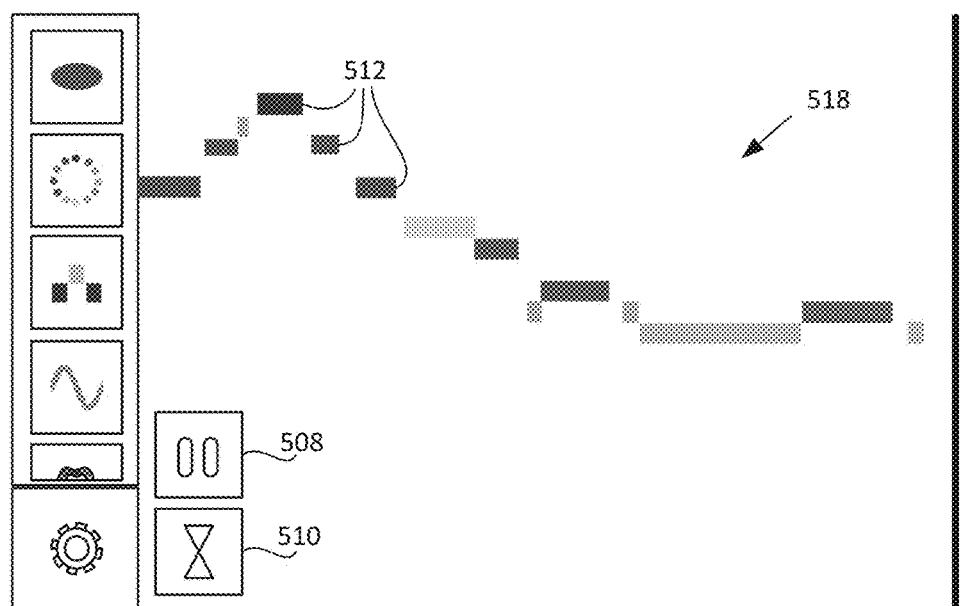

As illustrated in FIG. 6B, the different pitches are represented by correlating colored rectangular bars 512, as mapped out in the aforementioned colored wheel format. In some embodiments, the length of each rectangular bar 512 may represent the amount of time a note 104 is held. Additionally, the rectangular bars 512 that are higher on the screen depict notes 104 that are higher in pitch than the notes 104 of the lower rectangular bars 512. Every pitch has its own specified horizontal space in chromatic order, such as: A, A#, B, C, C#, D, etc.

The note bar settings box 500 may also be used for controlling the visual effect of the bars 512. The note bar settings box 500 enables pausing, resetting, and zooming the grey buttons on the lower right section of the screen. For example, depressing a light grey pause button stops the bars 512 from scrolling. Another feature is an hourglass button that enables vertical or horizontal expansion and contraction of the screen. As with all of the tools, the note bar scroll format 518 visualizes the pitch the instant it is played. It is possible to zoom in or out and scroll back and forwards to see different parts of the visual recording. A green vertical bar on the far right side indicates the beginning on the visual recording. A red vertical bar on the far left side indicates the end of the visual recording.

The note bar settings box 500 may further include, without limitation: a pause and run portion 502 for toggling on and off to follow the notes 104 across the screen in real time; a zoom portion 504 for adjusting the view by zooming vertically and horizontally; a follow notes portion 506 for setting the sensitivity of following the notes 104 up and down on the screen; a note bar sensitivity portion 508 for controlling how close the note 104 has to be when played with a predetermined number of cents; and a note quantity portion 510 for controlling the number of notes 104 that appear on the screen at one time.

Figure 6C:
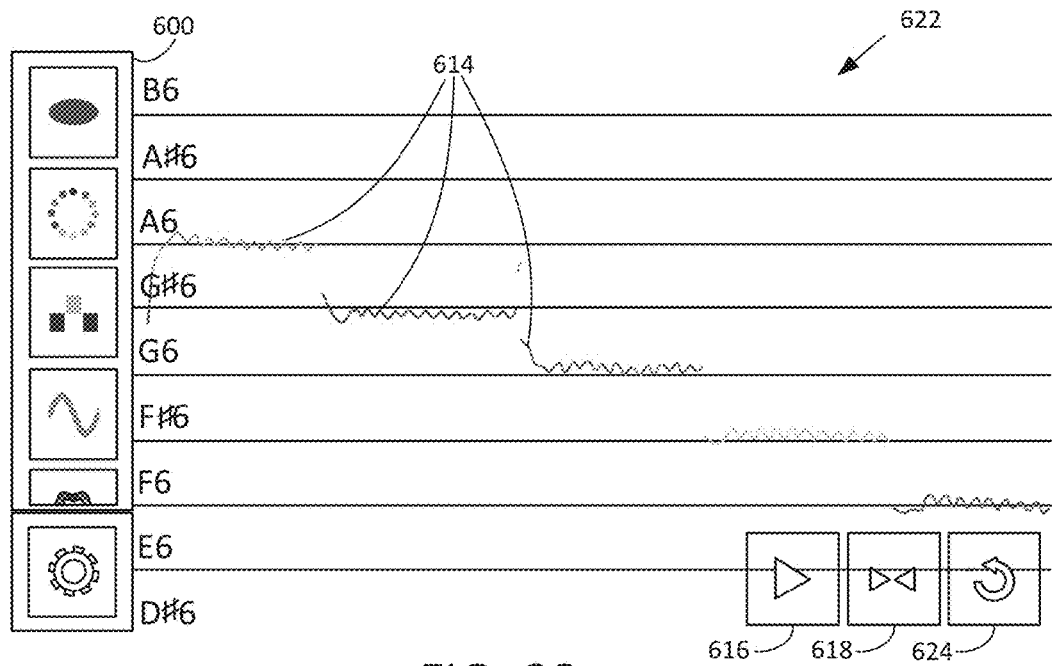
Figure 6D:
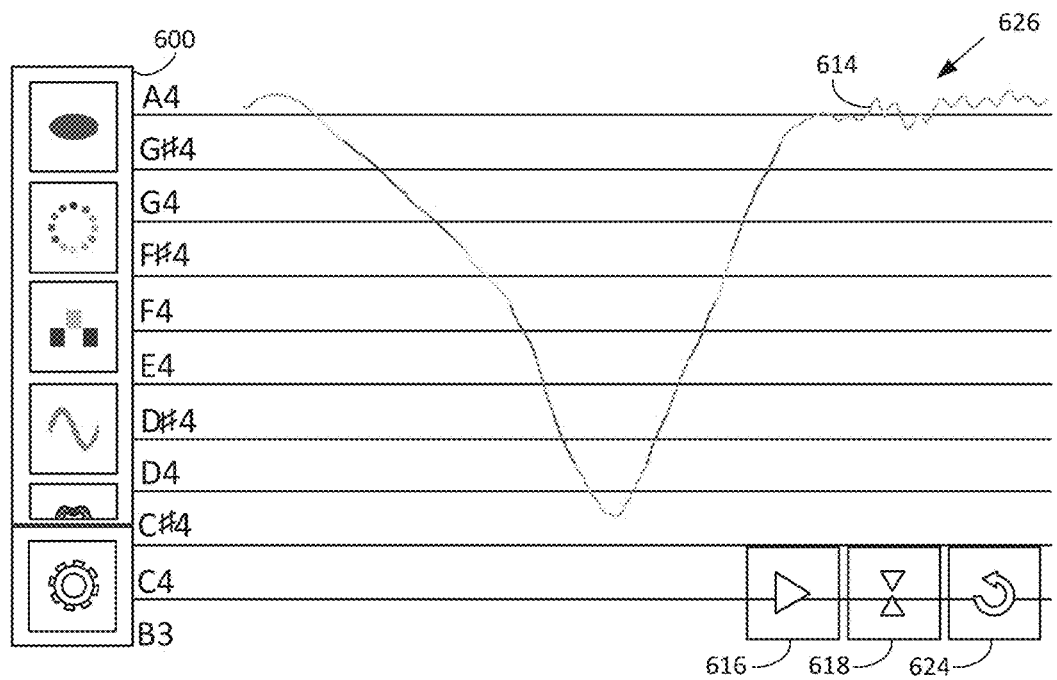

FIG. 6C illustrates the pitch line format 620, wherein the notes 104 scrolling from right to left in real time are visible in a wide view format 622. The wider view provides a unique perspective for studying the more subtle aspects of the pitch frequencies. FIG. 6D illustrates the notes 104 scrolling across the screen in a glissando format 626, in which a slide occurs from an A4 pitch to a D4 pitch, and then returning to A4. This provides another unique graphical view that displays quantitative sound information in a real-time, data-rich visualization. These pitch line visualization tools allow an in depth look into that which previously could not be viewed in a meaningful way.

Figure 6E:
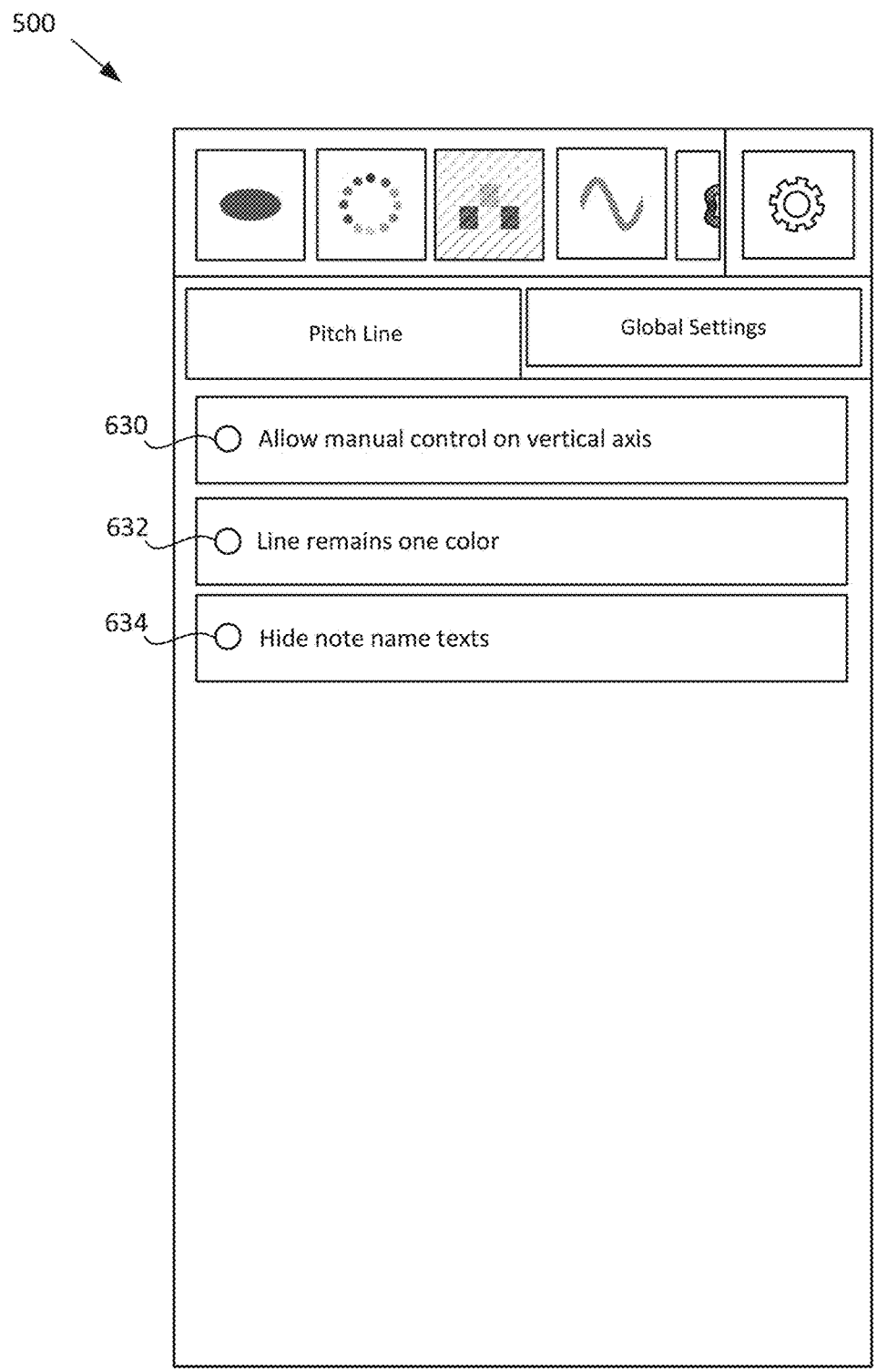

In some embodiments, the rectangular bars 512 may be adjusted with a bar scroll settings box 628 (FIG. 6E). In one embodiment, a vertical axis control portion 630 enables manual control of the vertical axis. A line color portion 632 enables the rectangular bars 512 for each pitch to be changed to a desired color. A note labeling portion 634 enables the note 104 for each rectangular bars 512 to be labeled with a customized label, or hidden from view.

Figure 7A:
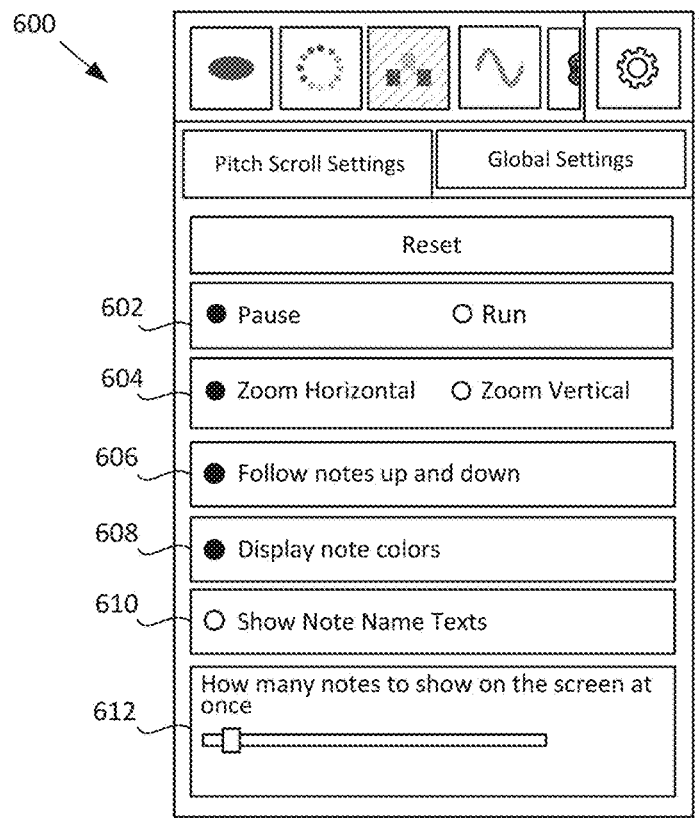
FIGS. 7A and 7B illustrates a screenshot an diagrams of exemplary settings for the graphical representations of the pitch as a pitch line, where

FIG. 7A illustrates a screenshot of a pitch line settings box 600 for controlling the parameters of the pitch frequency, as used in a pitch line format 620. In one embodiment, the notes 104 scroll form right to left in real time, and are depicted as at least one pitch line 614. The pitch line settings box 600 may include, without limitation: a line pause and run portion 602 for toggling on and off to follow the notes 104 across the screen in real time; a line zoom portion 604 for adjusting the view by zooming vertically and horizontally; a pitch line follow portion 606 for setting the sensitivity of following the notes 104 up and down on the screen; a line color portion 608 for displaying or hiding the colors of the pitch line 614; a line note labeling portion 610 for showing or hiding a label of the note 104 adjacent to the pitch line 614; and a line note quantity portion 612 for controlling the number of notes 104 that appear on the screen at one time.

Figure 7B:
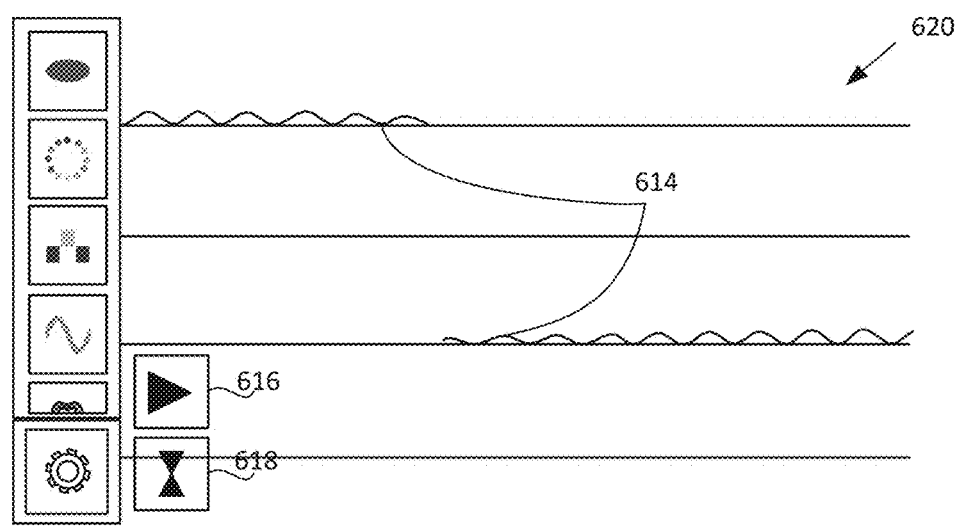

Turning now to FIG. 7B, the pitch line format 620 shows the notes 104 scrolling from right to left across the screen in real time. The different pitch frequencies are represented by correlating colored pitch lines 614, as mapped out in the aforementioned note bar scroll format 518. In some embodiments, the length of the pitch line 614 may represent the amount of time a note 104 is held. Additionally, the pitch lines 614 that are higher on the screen depict notes 104 that are higher in pitch than the notes 104 of the lower pitch lines 614. In one embodiment, a line pause button 616 enables stoppage of the scrolling, a line hourglass button 618 enables expansion and contraction of the screen, and a rewind button 624 enables the notes 104 to be replayed.

Figure 8A:
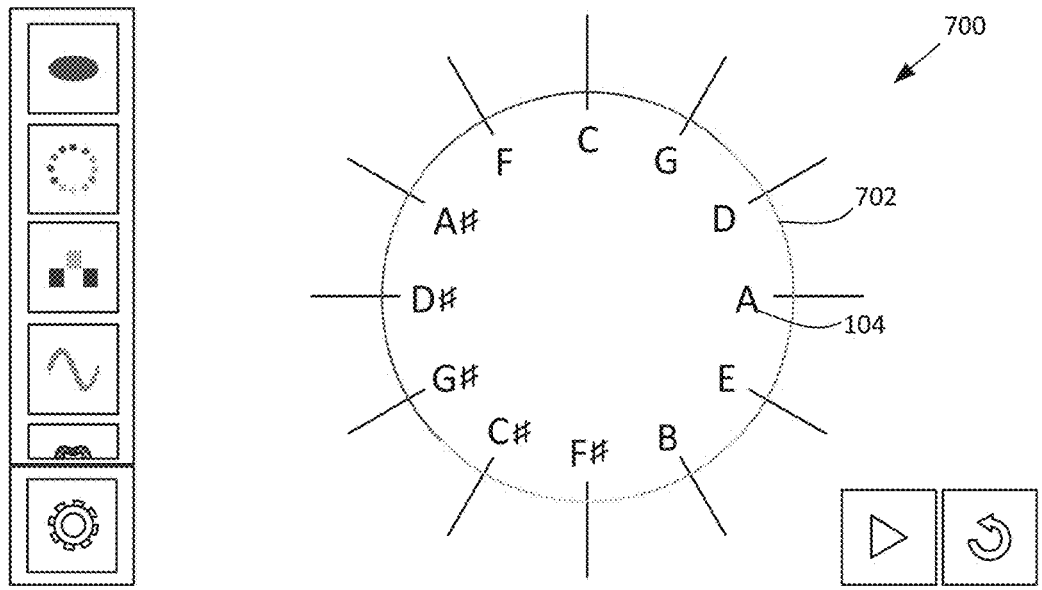
FIGS. 8A, 8B, 8C, 8D, 8E, and 8F illustrate screenshots and diagrams of exemplary settings and graphical representations of a pitch circle graph for identifying pitch tendencies, where

FIG. 8A illustrates a screenshot of a pitch tendency circle 700 for visually indicating pitch tendencies in a circular shape. A circular pitch line 702 forms a circumference around a plurality of notes 104 that are segmented into quadrants. Each note 104 has a unique quadrant. In one exemplary embodiment, as the notes 104 play, the pitch tendency circle 700 is configured to record the pitch tendencies in real time and add them up while the recording of the sound continues. In this manner, the pitch tendencies are visible on the pitch tendency circle 700.

In one exemplary use of the pitch tendency circle 700, all of the "D" musical notes are sharp. The pitch tendency circle 700 shows this. As the pitch tendency circle 700 records the pitch frequencies, the circular pitch line 702 deforms outwardly from the initial circumferential configuration. The more the circular pitch line 702 stretches, the more often that particular pitch is identified. In some embodiments, the circular pitch line 702 deforms to the point of forming at least one peak 704. A peak that is clockwise of the hash mark indicates a sharp. A peak that is counter clockwise indicates a flat. A peak that is on the hash mark indicates an in-tune pitch.

Figure 8B:
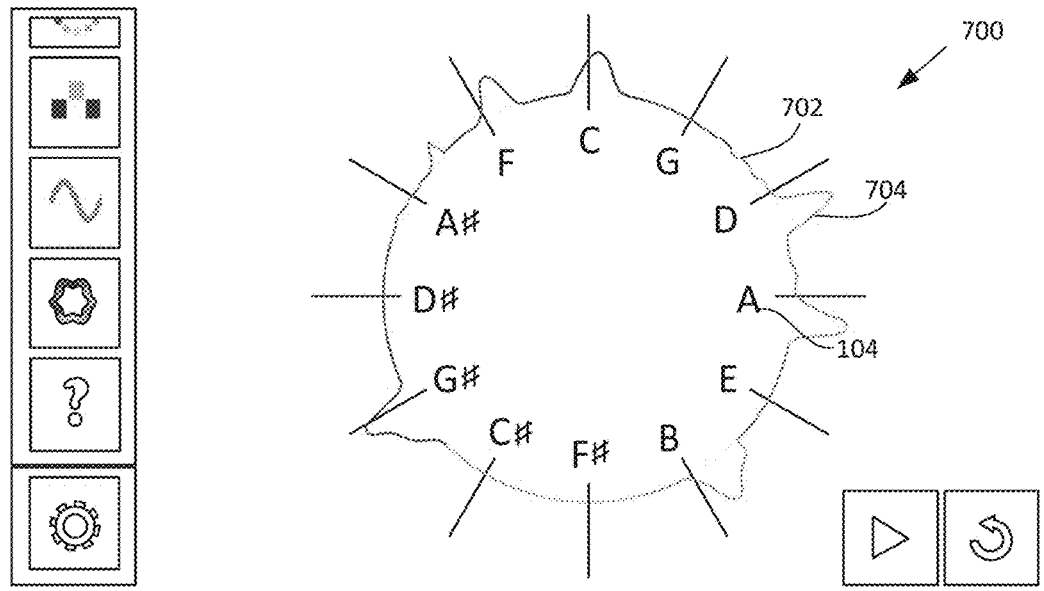

Turning to the screenshot illustrated in FIG. 8B, the system 100 records the pitch frequencies as the F, C, D, A, B and G# notes. At least one peak 704 forms where the detected pitches are being played. The longer a pitch sounds, the higher the peak 704 created. Consequently, D's, F's and A's are on the sharp side, while the B is flat and the G# is pretty in tune. The pitch tendency circle 700 is yet another example of the system 100 creating a dynamic pitch-based representation of the sound of music notes.

Figure 8C:
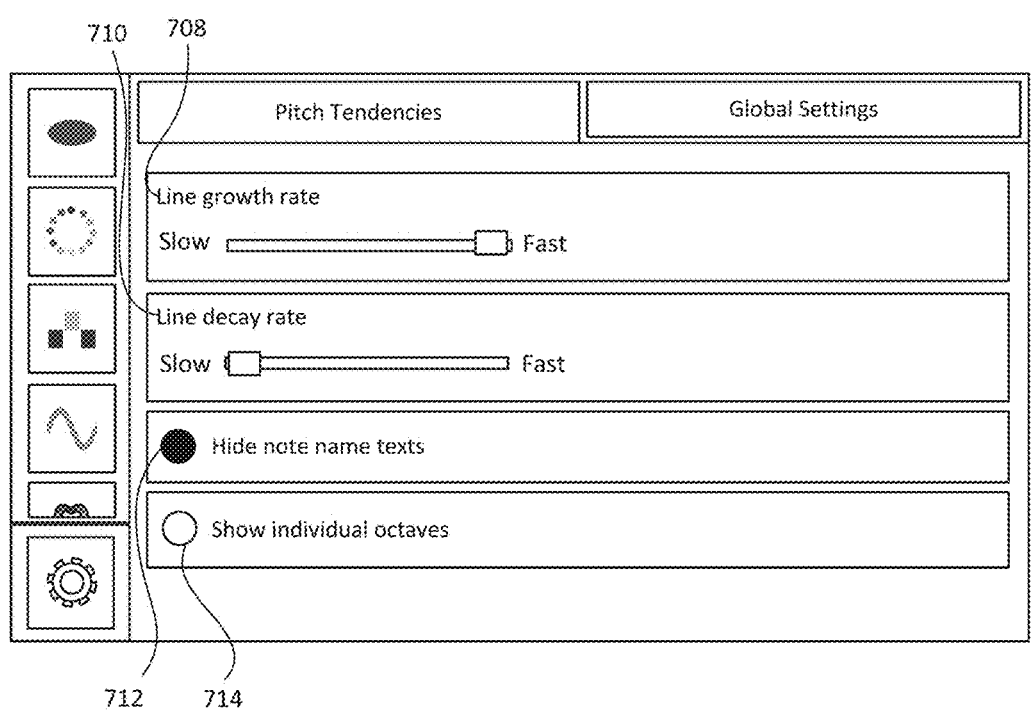
Figure 8D:
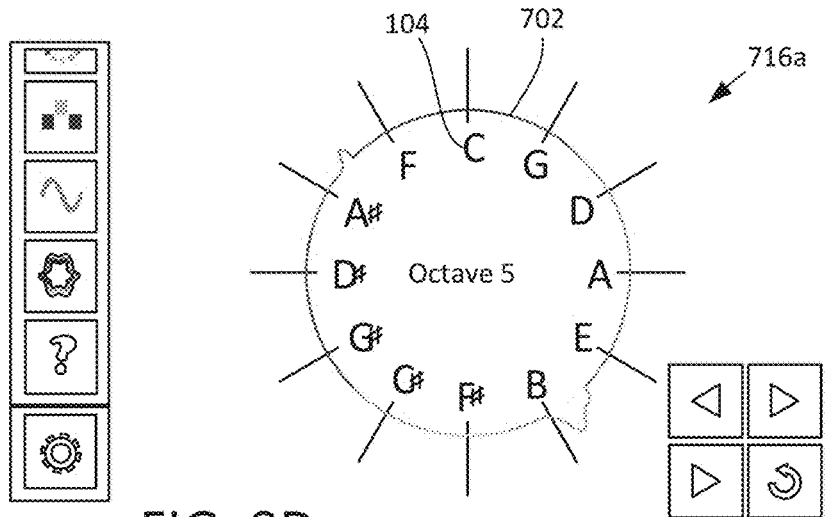
Figure 8E:
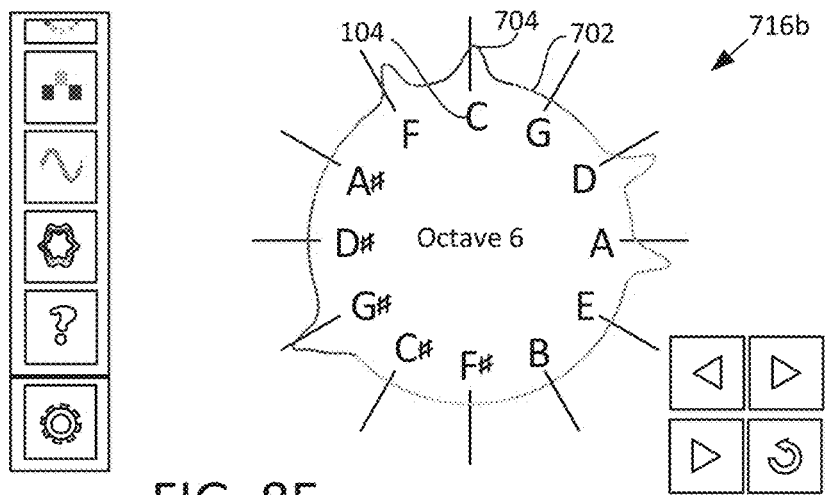
Figure 8F:
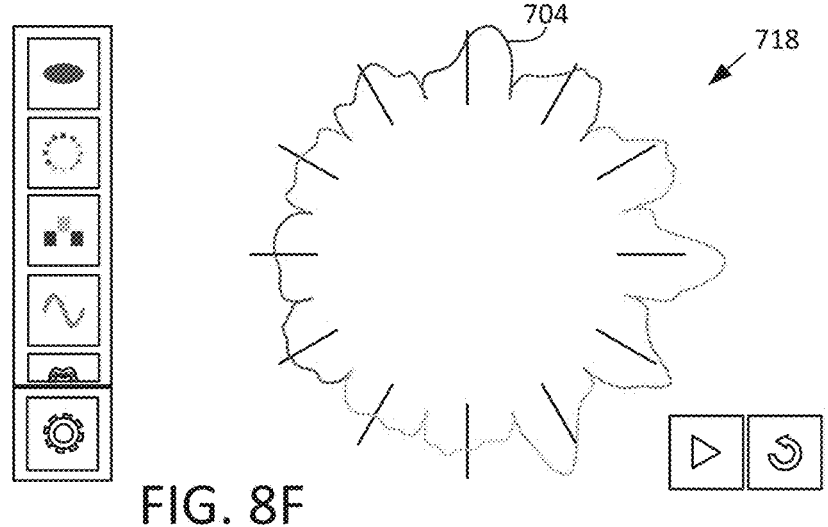

FIG. 8C illustrates a pitch tendency settings box 706 that allows for adjustment of the circular pitch line 702. A line growth rate portion 708 and a line decay rate portion 710 adjust the growth and decay rates of the circular pitch line 702. The pitch tendency settings box 706 further includes a label portion 712 that displays and hides a label for each note 104. An octave display portion 714 enables selective displaying of all octaves combined onto one screen or each octave individually. An example of this is illustrated in FIGS. 8D and 8E, which show two pitch circles 716a, 716b sharing the same notes 104, but having their octaves separated in octave #5 and octave #6. FIG. 8F illustrates an unlabeled pitch circle 718 where the label portion 712 removed the label of the notes 104. Though, despite the loss of a label, the coloring on the unlabeled pitch circle 718 remains to help indicate notes 104.

Figure 9A:
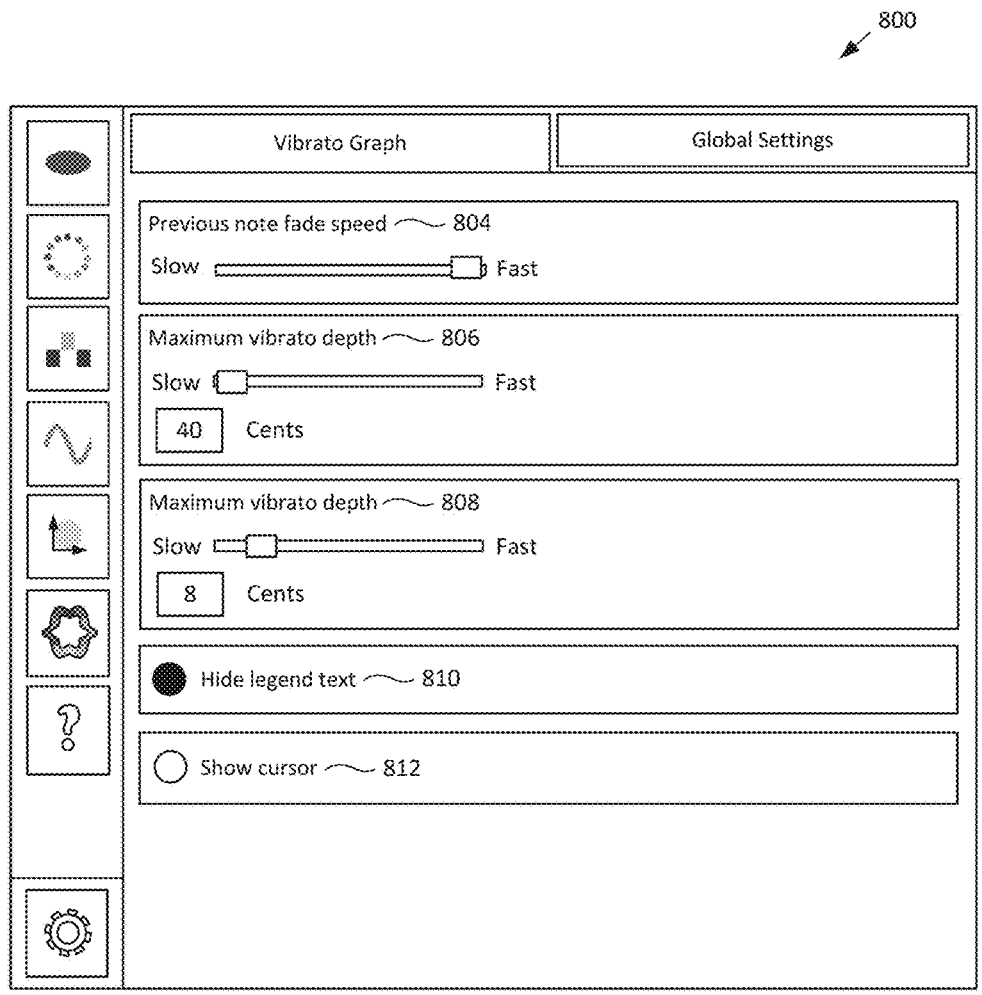
FIGS. 9A, 9B, 9C, 9D, and 9E illustrate screenshots and diagrams of exemplary settings and graphical representations of a vibrato graph for identifying vibrato, where

FIG. 9A illustrates a vibrato graph settings box 800 for controlling settings on a vibrato graph 802. As illustrated in FIGS. 9B-9E, the vibrato graph 802 is configured to visually indicate the speed and amplitude (highest and lowest pitch) of the vibrato in real time amorphous and dynamic display of color on a black screen. In some embodiments, the speed is represented on the horizontal axis in Hertz. The pitch amplitude is represented on the vertical axis. The axes are adjustable through the vibrato graph settings box 800. When a note 104 is held with vibrato, a circular color, corresponding to the played note 104, appears on the vibrato graph 802. The most recently played notes 104 are the brightest and the note 104 colors fade slowly over time.

For example, without limitation, a fast, shallow vibrato color appears in the lower right area, while a slow and deep vibrato color appears in the upper left. Those skilled in the art will recognize that vibrato is a musical effect consisting of a regular, pulsating change of pitch. It is used to add expression to vocal and instrumental music. The vibrato is typically characterized in terms of two factors: the amount of pitch variation (extent of vibrato) and the speed with which the pitch is varied (rate of vibrato).

Figure 9B:
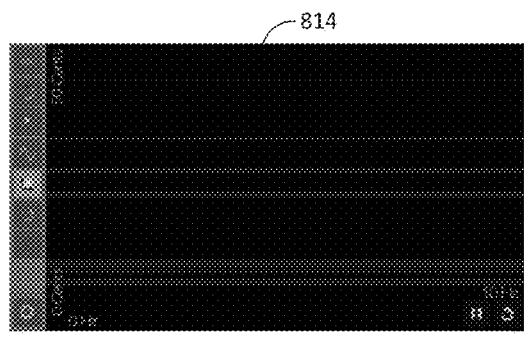

Another example of the vibrato graph 802 is depicted in FIG. 9B. The vibrato graph 802 displays a D note 104 with a first vibrato embodiment 814 charted in the lower left, which indicates a slow and shallow pitch frequency for that note 104. The visualization slowly fades after each note 104 is played and the most recently played notes 104 appear brightest. A thin circular curser shows the position of the most current note 104 being played.

Figure 9C:
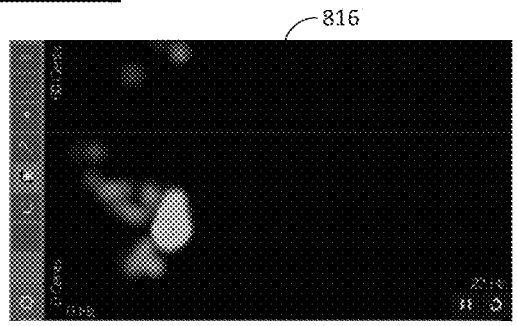
Figure 9D:
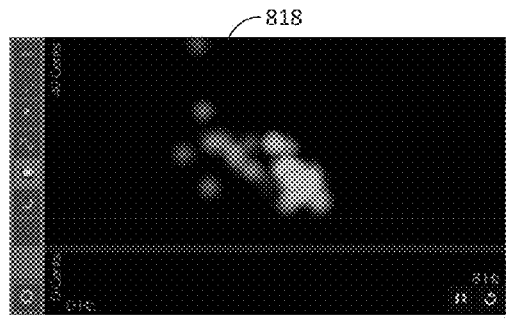
Figure 9E:
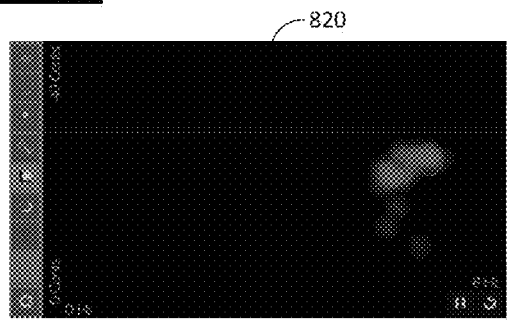

FIG. 9C illustrates the vibrato graph 802 having a D note 104 being played again, but with the vibrato graph settings changed. This results in a different, second vibrato embodiment 816. In the second vibrato embodiment 816, the horizontal axis is set 0-8 HZ and the vertical is set 0-40 Cents. FIG. 9D illustrates the vibrato graph 802 showing an Ab note 104 being played. This forms a third vibrato embodiment 818 having a fast speed and medium wide depth. FIG. 9E illustrates the vibrato graph 802 showing numerous notes 104 that were played over a period of time and the location of vibrato in real time as well as the colors of the notes 104 that have been played, resulting in a fourth vibrato embodiment 820. In this fourth vibrato embodiment 820, the most recently played notes 104 are the brightest and the note colors fade slowly over time.

As discussed above, the vibrato graph settings box 800 regulates the visual display of the vibrato in the vibrato graph 802. A fade speed portion 804 controls the rate of the fade for the change in dimensions of the color. A vibration depth portion 806 sets the maximum vibration depth. A vibration speed portion 808 sets the maximum vibration speed. A vibrato label portion 810 enables displaying and hiding of a label for each note 104. A cursor portion 812 positions the cursor on the vibrato graph 802.

Figure 10:
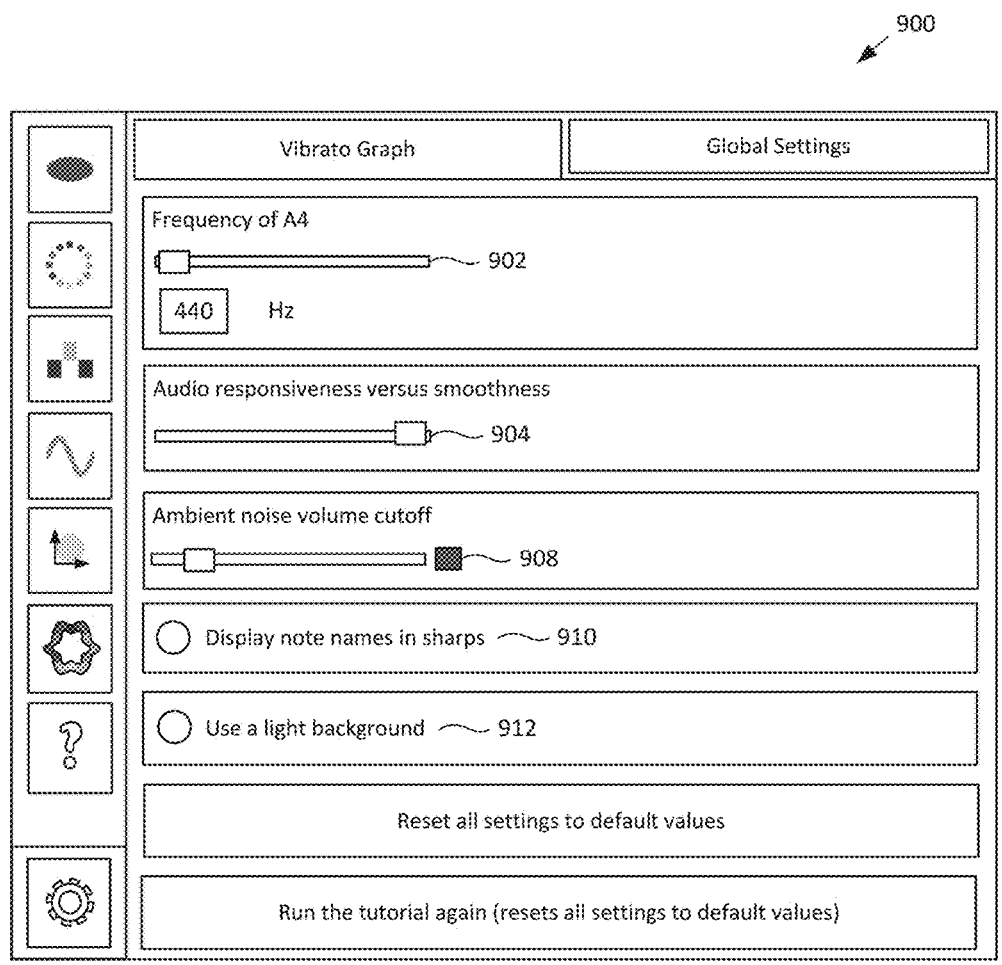
FIG. 10 illustrates a screenshot of an exemplary global settings box, in accordance with an embodiment of the present invention.

FIG. 10 shows a screenshot of a global settings box 900. The global settings box 900 is configured to control the graphical tools. In one embodiment, the global settings box 900 may be accessed from the software application by pressing an icon of a gear symbol from any screen in the software application. In this manner, adjustments may be performed more efficiently. Once in the global settings box, a Global Settings tab may be clicked to engage the global settings box 900.

In one possible embodiment, the global settings box 900 adjusts the pitch setting (default is A 440) with a pitch adjustment portion 902. The global settings box 900 adjusts the audio responsiveness vs smoothness with an audio portion 904. It is also significant to note that the more sensitive the software application is, the more jumpy it can be. The smoother it is, the less sensitive and jumpy it will be.

The global settings box 900 may further comprise an ambient noise adjustment portion 906 that helps squelch ambient noise. It is significant to note that ambient noise adjustments may help the software application respond better in loud or quiet situations. The global settings box 900 also enables selection of whether to display names of the notes 104 in flats or sharps in a note selection portion 908. Also, each graphic tool other than the vibrato graph 802, has the option for a black or a white background through selection with a background light portion 910. Finally, a debug portion 912 enables viewing of a debug format, described below.

Figure 11A:
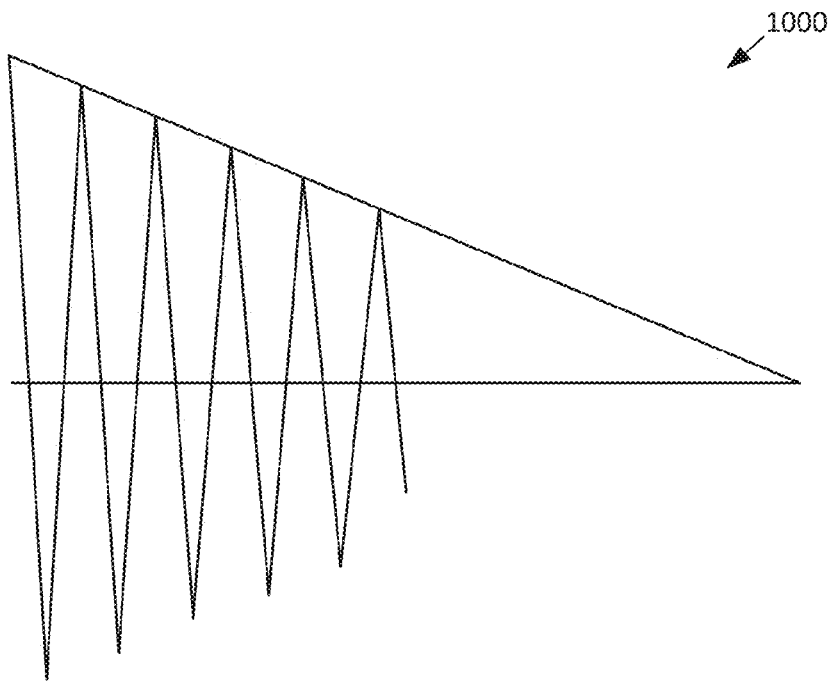
FIGS. 11A, 11B, and 11C illustrate harmonics of an exemplary audio signal, where
Figure 11B:
Figure 11C:
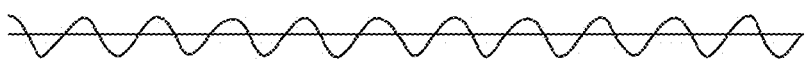

As referenced in FIGS. 11A, 11B, and 11C, the system 100 further includes a debug format that is useful for testing and development. The debug format also enables returning to original settings and replaying a tutorial. The debug format utilizes the pitch detection algorithm to analyze parts of the sound fast enough to create useful feedback for teaching or, at a higher level, for practicing musicians to refine their technique. While using the debug format, the algorithm manipulates an audio signal 1000 generated by the musical notes to quantify the pitch and sound into an artistic, data-driven format represented by the graphical representation.

FIG. 11A shows the audio signal 1000 as an input audio signal that represents a periodic function over time for the musical notes 104. Those skilled in the art will recognize that the audio signal 1000 is represented as sinusoidal musical sound comprised of a summation of individual sine waves. The algorithm performs a mathematical transformation on the sine waves to transform the periodic function over time into a frequency domain. FIG. 11B illustrates the pitch detection algorithm capturing a moment in the frequency domain as a frequency plot 1002. The frequency plot 1002 is essentially a power distribution of the Fourier transformation of the audio signal 1000.

Those skilled in the art will recognize that there are various algorithms known in the art for pitch estimation, including, without limitation, the Average Magnitude Difference Function (AMDF), which is a broad class that any of the other algorithms can fall under; Harmonic Product Spectrum (HPS); Autocorrelation; Log Harmonic Product Spectrum; Parallel Processing Pitch Detector; Square Difference Function (SDF); Cepstral Pitch Determination; Subharmonic-to-harmonic ratio; and a Super Resolution Pitch Detector (SRPD).

The debug format, however, utilizes the algorithm in the form of a modified Type 2 NSDF 1004. It is significant to note that NSDF 1004 is only one component of the algorithm, rather than the entire algorithm being part of NSDF 1004. FIG. 11C illustrates the NSDF 1004 having multiple peaks, which are analyzed to compute the graphical description of the pitch frequency. The NSDF 1004 transforms the audio signal 1000 into pitch waves that are used to create graphical representations of the variations and durations of the pitch frequency. The generated pitch waves form peaks that correspond to multiples of the fundamental pitch. Analysis of the peaks enables the NSDF 1004 to generate the pitch at about 60 Hertz. This precise calculation of the pitch allows the system 100 to generate the pitch circles 200, the rectangular bar 512, the colored wheel 410, and the pitch lines 614 that allow for more precise graphical depiction of variations in the pitch by showing minute variations in pitch, and clear viewing of vibrato.

In one embodiment, an SDF is defined: $d'_t(\tau)=\Sigma(xj-xj+\tau)^2$ $\tau+W-\tau-1$ $j=\tau$
where: t is a time index; $\tau$ is lag; $d'_t(\tau)$ is an autocorrelation function of lag; W is the initial window size; and xj is a discrete signal. The NSDF 1004 function is defined as: $n\_t(T)=2\ r\_t'(T)/m\_t'(T)$ where r is type 2 autocorellation and $m\_t'(T)=sum\_\{j=t\}^{\wedge}(t+W-T-1)(x\_j^{\wedge}2+x\_(j+T)^{\wedge}3$ Different equations for the Type 2 NSDF 1004 may, however, be used to analyze the pitch and sound as various types of NSDF 1004 and the definitions of values in the NSDF 1004 change. It is, however, significant to note that it is the combination of algorithms that enable the precise pitch detection at 60 Hz. This can be accomplished on even first generation tablets and phones.

Figure 12:
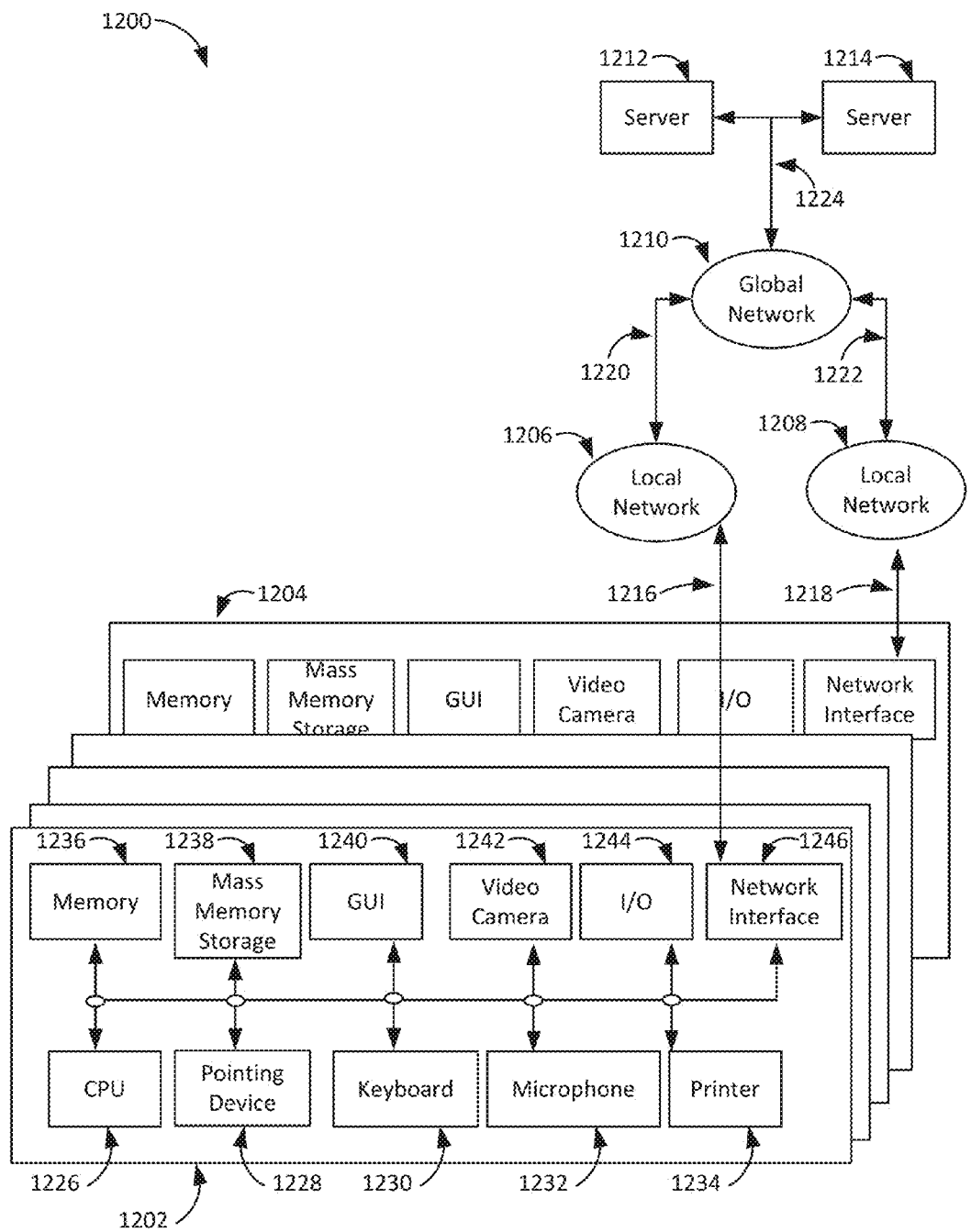
FIG. 12 illustrates a block diagram depicting an exemplary client/server system which may be used by an exemplary web-enabled/networked embodiment, in accordance with an embodiment of the present invention.

FIG. 12 is a block diagram depicting an exemplary client/server system which may be used by an exemplary web-enabled/networked embodiment of the present invention.

A communication system 1200 includes a multiplicity of clients with a sampling of clients denoted as a client 1202 and a client 1204, a multiplicity of local networks with a sampling of networks denoted as a local network 1206 and a local network 1208, a global network 1210 and a multiplicity of servers with a sampling of servers denoted as a server 1212 and a server 1214.

Client 1202 may communicate bi-directionally with local network 1206 via a communication channel 1216. Client 1204 may communicate bi-directionally with local network 1208 via a communication channel 1218. Local network 1206 may communicate bi-directionally with global network 1210 via a communication channel 1220. Local network 1208 may communicate bi-directionally with global network 1210 via a communication channel 1222. Global network 1210 may communicate bi-directionally with server 1212 and server 1214 via a communication channel 1224. Server 1212 and server 1214 may communicate bi-directionally with each other via communication channel 1224. Furthermore, clients 1202, 1204, local networks 1206, 1208, global network 1210 and servers 1212, 1214 may each communicate bi-directionally with each other.

In one embodiment, global network 1210 may operate as the Internet. It will be understood by those skilled in the art that communication system 1200 may take many different forms. Non-limiting examples of forms for communication system 1200 include local area networks (LANs), wide area networks (WANs), wired telephone networks, wireless networks, or any other network supporting data communication between respective entities.

Clients 1202 and 1204 may take many different forms. Non-limiting examples of clients 1202 and 1204 include personal computers, personal digital assistants (PDAs), cellular phones and smartphones.

Client 1202 includes a CPU 1226, a pointing device 1228, a keyboard 1230, a microphone 1232, a printer 1234, a memory 1236, a mass memory storage 1238, a GUI 1240, a video camera 1242, an input/output interface 1244 and a network interface 1246.

CPU 1226, pointing device 1228, keyboard 1230, microphone 1232, printer 1234, memory 1236, mass memory storage 1238, GUI 1240, video camera 1242, input/output interface 1244 and network interface 1246 may communicate in a unidirectional manner or a bi-directional manner with each other via a communication channel 1248. Communication channel 1248 may be configured as a single communication channel or a multiplicity of communication channels.

CPU 1226 may be comprised of a single processor or multiple processors. CPU 1226 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1236 is used typically to transfer data and instructions to CPU 1226 in a bi-directional manner. Memory 1236, as discussed previously, may include any suitable computer-readable media, intended for data storage, such as those described above excluding any wired or wireless transmissions unless specifically noted. Mass memory storage 1238 may also be coupled bi-directionally to CPU 1226 and provides additional data storage capacity and may include any of the computer-readable media described above. Mass memory storage 1238 may be used to store programs, data and the like and is typically a secondary storage medium such as a hard disk. It will be appreciated that the information retained within mass memory storage 1238, may, in appropriate cases, be incorporated in standard fashion as part of memory 1236 as virtual memory.

CPU 1226 may be coupled to GUI 1240. GUI 1240 enables a user to view the operation of computer operating system and software. CPU 1226 may be coupled to pointing device 1228. Non-limiting examples of pointing device 1228 include computer mouse, trackball and touchpad. Pointing device 1228 enables a user with the capability to maneuver a computer cursor about the viewing area of GUI 1240 and select areas or features in the viewing area of GUI 1240. CPU 1226 may be coupled to keyboard 1230. Keyboard 1230 enables a user with the capability to input alphanumeric textual information to CPU 1226. CPU 1226 may be coupled to microphone 1232. Microphone 1232 enables audio produced by a user to be recorded, processed and communicated by CPU 1226. CPU 1226 may be connected to printer 1234. Printer 1234 enables a user with the capability to print information to a sheet of paper. CPU 1226 may be connected to video camera 1242. Video camera 1242 enables video produced or captured by user to be recorded, processed and communicated by CPU 1226.

CPU 1226 may also be coupled to input/output interface 1244 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1226 optionally may be coupled to network interface 1246 which enables communication with an external device such as a database or a computer or telecommunications or internet network using an external connection shown generally as communication channel 1216, which may be implemented as a hardwired or wireless communications link using suitable conventional technologies. With such a connection, CPU 1226 might receive information from the network, or might output information to a network in the course of performing the method steps described in the teachings of the present invention.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. One or more computer storage media storing computer-usable instructions, that when used by one or more computing devices, cause the one or more computing devices to perform a method for quantifying a sound into dynamical graphical images comprising the steps of:
    a) recording a sound;
    b) filtering the sound with at least one filter;
    c) identifying a pitch frequency from the filtered sound;
    d) analyzing, with a modified Type 2 Normalized Square Difference Function, at least one peak that forms on the pitch frequency;
    e) performing a Morlet Wavelet transform on the pitch frequency for determining a specific octave of the pitch frequency;
    f) verifying a specific octave of the pitch frequency based on a power spectrum;
    g) increasing the speed of the pitch frequency and the at least one peak through a Lagrangian interpolation;
    h) generating a graphical representation of the pitch frequency; and
    i) comparing the graphical representation of the pitch frequency to a reference pitch frequency.

2. The method of claim 1, further including the step of integrating at least one original musical score into the method, the at least one original musical score forming a reference signal.

3. The method of claim 2, further including performing a comparison heuristic to a musical score pitch frequency against an NSDF signal generated by the Type 2 Normalized Square Difference Function.

4. The method of claim 3, further including comparing the local maxima and minima of the signals from a comparison heuristic signal and the NSDF signal, while discounting octave differences between the signals.

5. The method of claim 4, further including running a McLeod's pitch detection heuristic for transforming the NSDF signal into a candidate frequency.

6. The method of claim 5, further including tuning the heuristic comparison signal if multiple NSDF signals differ by more than approximately 13% of a linearized distance between at least one note at a current octave.

* * * * *